United States Patent
Ruiz Coll et al.

(10) Patent No.: US 10,362,335 B2
(45) Date of Patent: Jul. 23, 2019

(54) METHOD FOR IMPROVING THE QUALITY OF AN IMAGE SUBJECTED TO RECODING

(71) Applicants: José Damián Ruiz Coll, Madrid (ES); Oscar Patiño Gonzalez, Madrid (ES)

(72) Inventors: José Damián Ruiz Coll, Madrid (ES); Oscar Patiño Gonzalez, Madrid (ES)

( * ) Notice: Subject to any disclaimer, the term of this patent is extended or adjusted under 35 U.S.C. 154(b) by 96 days.

(21) Appl. No.: 15/516,522

(22) PCT Filed: Oct. 3, 2014

(86) PCT No.: PCT/ES2014/000163
§ 371 (c)(1),
(2) Date: Apr. 3, 2017

(87) PCT Pub. No.: WO2016/050991
PCT Pub. Date: Apr. 7, 2016

(65) Prior Publication Data
US 2018/0270506 A1    Sep. 20, 2018

(51) Int. Cl.
*H04N 19/60* (2014.01)
*H04N 19/154* (2014.01)
(Continued)

(52) U.S. Cl.
CPC ........... *H04N 19/60* (2014.11); *H04N 19/114* (2014.11); *H04N 19/154* (2014.11);
(Continued)

(58) Field of Classification Search
CPC combination set(s) only.
See application file for complete search history.

(56) References Cited

U.S. PATENT DOCUMENTS

| | | |
|---|---|---|
| 5,666,209 A | 9/1997 | Abe |
| 6,658,157 B1 | 12/2003 | Satoh et al. |

(Continued)

OTHER PUBLICATIONS

Int'l Search Report dated May 18, 2015 in Int'l Application No. PCT/ES2014/000163.

*Primary Examiner* — Md N Haque
(74) *Attorney, Agent, or Firm* — Panitch Schwarze Belisario & Nadel LLP

(57) ABSTRACT

The invention relates to a method for improving the quality of an image or video sequence subjected to recoding, wherein the image is decoded and subsequently re-encoded. The method involves detecting, following the image decoding, whether the image has undergone any spatial displacement; in the event that it has, compensating for such spatial displacement by arranging the image on an image with a higher resolution such that the spatial position of the blocks of the higher-resolution image coincides with the spatial position of the blocks of the image before decoding; and adding information about the cropping to be applied to the higher-resolution image for a subsequent decoder to recover the image with its original resolution. According to another embodiment of the invention, the method comprises calculating distortions for each displacement of each image of a video sequence; identifying higher-quality images in a GOP structure using the computed distortions; and temporally aligning the beginning of the GOP of a new re-encoding with the identified higher-quality images.

27 Claims, 17 Drawing Sheets

(51) Int. Cl.
*H04N 19/61* (2014.01)
*H04N 19/172* (2014.01)
*H04N 19/46* (2014.01)
*H04N 19/114* (2014.01)
*H04N 19/40* (2014.01)
*H04N 19/124* (2014.01)

(52) U.S. Cl.
CPC ........... *H04N 19/172* (2014.11); *H04N 19/40* (2014.11); *H04N 19/46* (2014.11); *H04N 19/61* (2014.11); *H04N 19/124* (2014.11)

(56) References Cited

U.S. PATENT DOCUMENTS

| | | | |
|---|---|---|---|
| 6,845,214 B1* | 1/2005 | Funaya | H04N 21/23614 375/E7.134 |
| 8,094,717 B2* | 1/2012 | Imagawa | G06T 3/0087 375/240.03 |
| 2006/0140503 A1* | 6/2006 | Kurata | H04N 5/3572 382/275 |
| 2008/0232459 A1 | 9/2008 | Kuyeung | |
| 2009/0016437 A1* | 1/2009 | Takahashi | H04N 19/139 375/240.16 |
| 2010/0232504 A1* | 9/2010 | Feng | H04N 19/176 375/240.13 |
| 2013/0209072 A1 | 8/2013 | Dikvall et al. | |

* cited by examiner

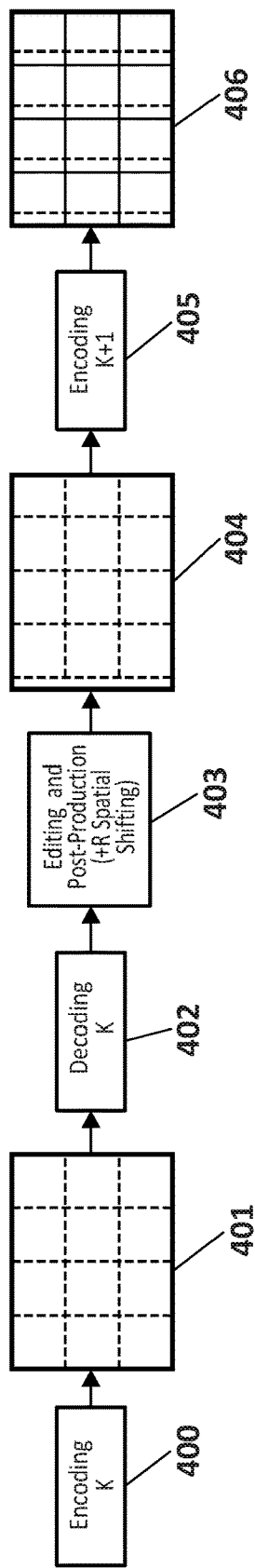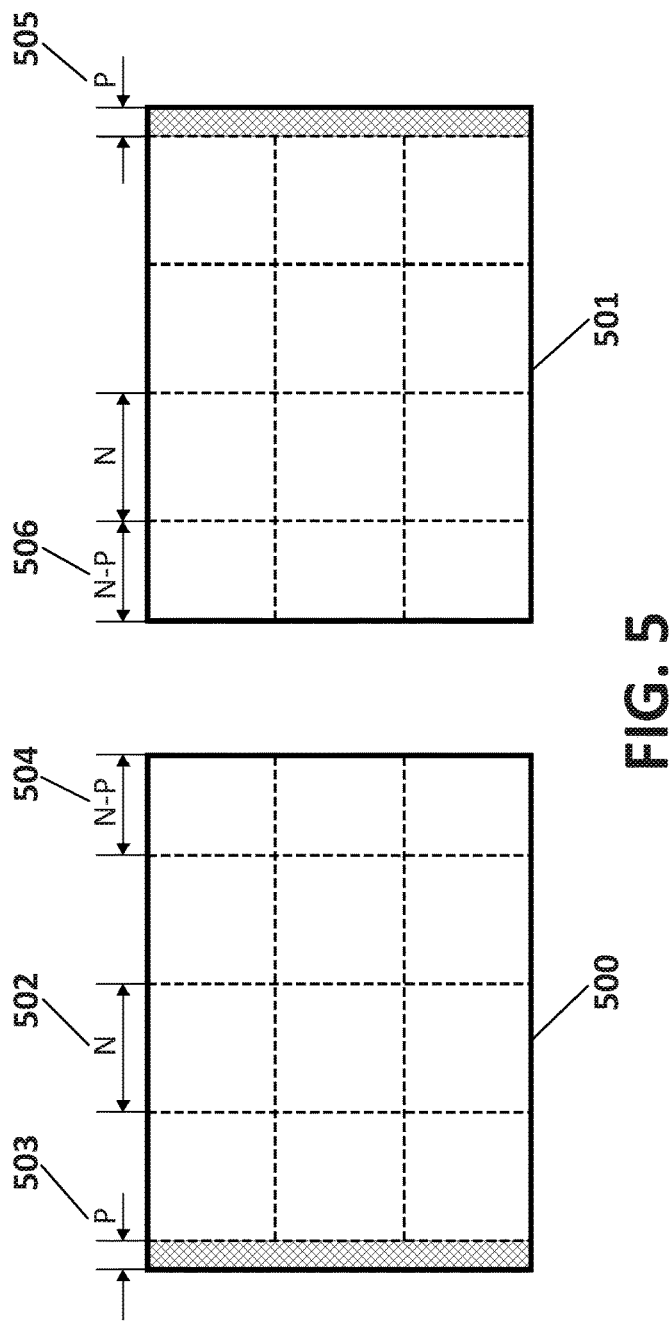

METHOD FOR IMPROVING THE QUALITY OF AN IMAGE SUBJECTED TO RECODING

CROSS-REFERENCE TO RELATED APPLICATION

This application is a Section 371 of International Application No. PCT/ES2014/000163, filed Oct. 10, 2015, which was published in the Spanish language on Apr. 7, 2016, under International Publication No. WO 2016/050991 A1, and the disclosure of which is incorporated herein by reference.

FIELD OF THE INVENTION

This invention concerns the field of image processing and more specifically describes a method for improving image quality by compensating for the quality losses produced in re-encoding processes.

BACKGROUND OF THE INVENTION

In recent decades, some image and video compression formats have been widely adopted for the television and cinema production industry based on international standards, such as MPEG-2 (ITU-T H.262), MPEG-4 Part 2 (ISO/IEC 14496-2), and MPEG-4 AVC (ISO/IEC 14496-10 and ITU-R H.264), as well as the latest standard, known as HEVC (High Efficiency Video Coding), approved as MPEG-H and ITU-T H.265. Furthermore, the audio-visual industry has adopted other proprietary compression formats that have emerged as variations of these standards. Such proprietary formats either limit some syntactic elements or constrain some functionalities of the coding algorithm. Among these are the format families known as Betacam, DVCPRO, AVC-Intra (SMPTE RP 2027-2007), DNxHD, (SMPTE VC-3), and ProRes.

The video compression formats used in production environments are characterized by their ability to achieve high video quality free of visual losses, without blocking artifacts nor any other perceptual artifacts inherent to lossy coding architectures. They usually share some parameters, such as 4:2:2 chroma subsampling and an Intra-Frame coding scheme, but some formats also use an Inter-Frame scheme based on motion estimation and motion compensation techniques.

Usually, formats used in the professional production field have high bitrates. For instance, Standard Definition (SD) formats usually use bit rates between 25 Mbps and 50 Mbps, High Definition (HD) formats use bit rates in the range of 50 Mbps to 400 Mbps, and Ultra-High Definition (UHD) formats use bitrates over 400 Mbps and up to 1 Gbps.

Content re-encoding is inevitable in many stages of the production workflow, wherever content stored in a particular compression format must be decoded in order to engage in editing or pre-processing, tasks that occur exclusively in the pixel domain. The content is later re-encoded for storage or delivery. FIG. 1 depicts an example of three steps of re-encoding or multi-generation, where the content is initially captured using a compression format 100, obtaining the first generation (1G) 101, after which content is re-encoded in the editing stage 102, becoming a second generation (2G) 103. Lastly, it is newly re-encoded in a third generation (3G) 104 for delivery to the end user 105.

As is well-known, the re-encoding processes (encoding stage followed by decoding stage), which are typical in the audio-visual production workflow, incur significant quality losses in each successive generations. Such losses are inherent to the transformation encoding scheme, but these re-encoding losses can be reduced if all the encoders in the workflow use the same encoding parameters, such as quantification parameters, Group Of Pictures (GOP), and motion parameters, among others. Even so, the re-encoding process using traditional encoding schemes can cause irreversible losses due to the non-finite arithmetic precision requirements of the transform kernel. Losses are further due to the rounding to integer arithmetic used in the inverse transformation stage in the decoding process, this effect is known as "IDCT-drift" (Inverse Discrete Cosine Transform drift). The new generation of video coding standards, such as H.264/AVC and HEVC (ITU-R H.265), have minimized these losses by using a new integer transform kernel based on approximation to the DCT (Discrete Cosine Transform).

With the aim of reducing encoding losses, the audio-visual industry, through the SMPTE (Society of Motion Picture and Television Engineers), approved the "SMPTE 327M-200. MPEG-2 Video Recording Data Set" standard, which defines the encoding parameters set that an MPEG-2 compatible video decoder (ISO/IEC 13818-2) can extract from the encoded video stream (ISO/IEC 13818-1) for sending to the next encoder, allowing that encoder to repeat the same encoding conditions applied by the previous encoder. These parameters must be sent by the decoder to the next encoder as ancillary data or "metadata," with the aim that they may be conveniently applied.

The standards "SMPTE 319M-2000. Transporting MPEG-2 Recording Information through 4:2:2 Component digital Interfaces" and "SMPTE 351M-2000. Transporting MPEG-2 Recording Information through High Definition Digital Interfaces" determine the mechanism to transport such metadata on the two lower significant bits of the chrominance components through the SDI and HD-SDI interfaces. This mechanism for transmitting encoding parameters from the decoder to the next encoder in the chain has many drawbacks, which hindered industry-wide adoption. These drawbacks include:

- The standard is constrained to the encoding of non-scalable profiles of the MPEG-2 standard, meaning it is inapplicable to encoders in the chain that support standards of higher efficiency than MPEG-2, such as the H.264 and HEVC standards.
- Its effectiveness is significantly reduced if the new coding cannot use the previous coding parameters, for example, if modifications to the bitrate or the GOP structure become necessary.
- Metadata transport in the least significant bits of the interfaces hinders its integrity along the chain, because many digital video devices process the 10 bits of the chrominance components, including the two least significant bits. Therefore, the metadata information stored in such parameters is lost.

For this reason, the coding formats used in professional production environments have high compression bitrates, on one hand to achieve maximum quality with the aim of preventing the different video processing operations (rotations, filters, or the insertion of other visual elements) from disturbing the perceptual quality, and on the other hand to provide high robustness against the distortions experienced across the different re-encoding cycles so that the perceptual quality presents neither distortions nor visible artifacts in the final encoding cycle.

Recommendation ITU-R BT.1872 proposes that, for high-definition formats encoded with the H.264 standard, the contribution services between production centers use a bit rate of 21 Mbps for transmission systems with only one re-encoding cycle, but it recommends the bitrate be increased by 66% (up to 35 Mbps) if up to three encoding cycles may occur in the transmission chain.

The "Apple ProRes, White Paper, October 2012" document collects the results of simulations performed with the ProRes 422 and ProRes 422 HQ compression formats. The objective quality losses as measured by the Peak Signal to Noise Ratio (PSNR) are close to 3 dB after the third generation. Although the multi-generation process leads to moderate quality losses in each encoding cycle, other factors in the workflow can significantly increase these losses. The paper "G. Sullivan; S. Sun; S. Regunathan; D. Schonberg; C. Tu; S. Srinivasan, Image coding design considerations for cascaded encoding-decoding cycles and image editing: JPEG analysis, JPEG 2000, and JPEG XR/HD Photo, Applications of Digital Image Processing XXXI, SPIE Proceedings Vol. 7073" analyzes the parameters that can increase such losses in a re-encoding scenario. Several image processes that may be applied in the pixel domain between the decoding and new encoding stages are described, including the conversion of color space (from YCbCr to RGB), color subsampling conversion (from 4:2:2 to 4:2:0), the use of different quantization parameters (variation in QP), the use of a compression format different from that previously used, and spatial shifting of the picture, known as "Spatial Shifting" or "Pixel Shifting."

Spatial shifts are frequently applied in video-editing processes, such as the image scaling or image filtering used in some digital effects, and can even happen from synchronization mismatches in the production equipment, such as video switchers or digital video effects inserters. FIG. 2 shows a workflow in which a spatial shift effect typically occurs between two consecutive re-encoding generations k 200 and k+1 202 due to a video editing or post-production stage 201.

FIG. 3 depicts another spatial shift effect that can happen in the recoding of an image or video sequence 300, which has been encoded and decoded 301, and which is inserted as a PiP ("Picture In Picture") 302. The new image includes the PiP with lower resolution (W×H) 303 located on <x,y> coordinates that are not a multiple of the N×N block size of the transform employed.

An example of a spatial shift effect between two consecutive stages of compression or coding 400 and 405 is shown in FIG. 4. Video compression schemes that use the transformational coding technique employing square blocks of size N×N apply such transformations to the whole image, taking as the origin of transformation the upper-left corner of the image 401. The editing and post-production processes in which the spatial displacement 403 can happen are forcedly applied to the decoded video sequence 402. FIG. 4 shows that after editing and post-production 403 there is a horizontal spatial shift to the right in image 404. The transformed block positions after the new encoding 405, marked 406 with solid lines, do not match with the transformed block positions in the previous encoding 400, marked with dashed lines 406. This misalignment between the positions of the transformed blocks in between the two coding stages increases image-quality losses.

The European Broadcasting Union (EBU), aware of the problem of quality degradation resulting from spatial shifting in re-encoding scenarios, introduced spatial shifting between generations in its video coding quality assessment methodology. "Massimo Visca and Hans Hoffmann, HDTV Production Codec Test" describes this methodology, which is called "Standalone chain with processing." The method evaluates the robustness of different images and video coding formats against the effect of spatial shifting.

"P. Lopez and P. Guillotel, HDTV video compression for professional studio applications, Picture Coding Symposium, PCS 2009, pp. 1, 4, 6-8 May 2009" demonstrates that objective quality losses, measured in terms of PSNR, are close to 2 dB after eight encoding cycles. However, the same report shows that under the same test conditions, if spatial shifting is introduced between each of the eight encoding stages, objective quality losses increase noticeably by around 8 dB, revealing the significant quality loss resulting from this type of processing in multi-generation scenarios.

Another well-known effect that increases multi-generational losses is misalignment between the positions of the GOP used in consecutive generations of encoding and decoding. As is widely known, GOP structures achieve the highest compression efficiency by applying a structure which alternates pictures of types I (Intra-coded picture), B (Bi-predictive picture), and P (Predicted picture). Depending on the compression standard, type B images can be used as reference pictures by other B pictures, composing a hierarchical structure with different layers of prediction. Likewise, such GOP structures commonly use different quantization steps for each of I, P, and B picture types. The I pictures are used as references for the remaining P and B pictures within the same GOP, usually quantified in a smaller quantification step, with the aim of achieving high quality with good prediction for the rest of the pictures that compose the GOP.

The P pictures, which are used as a reference for the B type pictures and the following P pictures, are usually quantified in a step slightly larger than that used for the I pictures. In general, the quality of the P pictures is slightly below that of the quality of the I pictures.

Finally, the B pictures are usually quantized in a step higher than that used by the I and P pictures belonging to the same GOP, since their quality does not affect the prediction of other pictures within the GOP. The B pictures used as a reference for other B pictures use an intermediate quantization step of that used for the P and B pictures, belonging to the lower reference picture layer. Consequently, the B pictures usually obtain lower quality than the I and P pictures belonging to the same GOP.

Generally, the second encoder, which receives the video sequence in baseband format, does not know the structure, length, and start position of the GOP previously used. Consequently, it uses a GOP which configuration may not coincide with those of the previous encoder, causing misalignments in the GOP structures between successive encoding generations. "Pierre Larbier, Keeping Video Quality Pristine throughout the Production Process: 4:2:2 10-bit H.264 encoding, SMPTE technical conference, Hollywood, October 2009," shows that GOP misalignment increases quality losses by 2 dB after seven generations.

Therefore, a method is needed to improve the quality of an image or video sequence subjected to various re-encoding processes. For example, it would be desirable to have a method that improves the quality of an image or video sequence by avoiding the quality losses experienced as a result of spatial shifting and/or GOP misalignment.

SUMMARY OF THE INVENTION

In order to solve the problems of the prior art, according to a first aspect, the present invention provides a method to improve the quality of an image subjected to a re-encoding process in which the image is decoded and subsequently re-encoded. The method comprises the steps of:

detecting, after the image has been decoded, whether it has been shifted in the spatial domain;

if so, compensating for the spatial shifting by positioning the image in a higher-resolution image so that the spatial position of the blocks of the higher-resolution image matches with the spatial position of the blocks of the image prior to its decoding; and adding information with the aim of supplying to the decoder instructions about the cropping that it will have to apply to the higher resolution image, in a decoding step after re-encoding, in order to recover the image in its original resolution.

The method according to the first aspect of the present invention can be applied to both independent images and to pictures belonging to a video sequence. Thus, the present invention provides a method which is valid for any lossy video compression format: using a two-dimensional transformational coding scheme based on non-overlapping blocks, the method is capable of detecting whether an image or video sequence has spatial shifting. If it does, it compensates for this shift prior to its new encoding, reducing quality losses that would be in addition to those losses inherent to the encoding system used.

According to a second aspect, the present invention provides a method to improve the quality of a video sequence subjected to a re-encoding process in which the video sequence is decoded and subsequently re-encoded. The method comprises the steps of:

calculating the distortions for each spatial shift of each of the pictures that compose the video sequence;

from the calculated distortions, identifying the encoded pictures with higher quality along the GOP structure of the video sequence; and matching the first picture of the GOP in the new encoding stage with the highest quality picture previously identified.

Thus, the method of the present invention identifies which images of the video sequence have been encoded with higher quality, allowing the starting position of the GOP structure to be aligned for the next encoder, avoiding or reducing the GOP misalignment losses.

BRIEF DESCRIPTION OF THE DRAWINGS

The present invention will be better understood by reference to the following drawings illustrating a preferred embodiment of the invention. Said embodiment is provided as an example, one which should not be interpreted as limiting the invention in any way.

FIG. 4 is a diagram showing the effects of a spatial shift between two consecutive compression stages.

FIG. 5 depicts examples of horizontal spatial displacement of an image.

Figure 1:
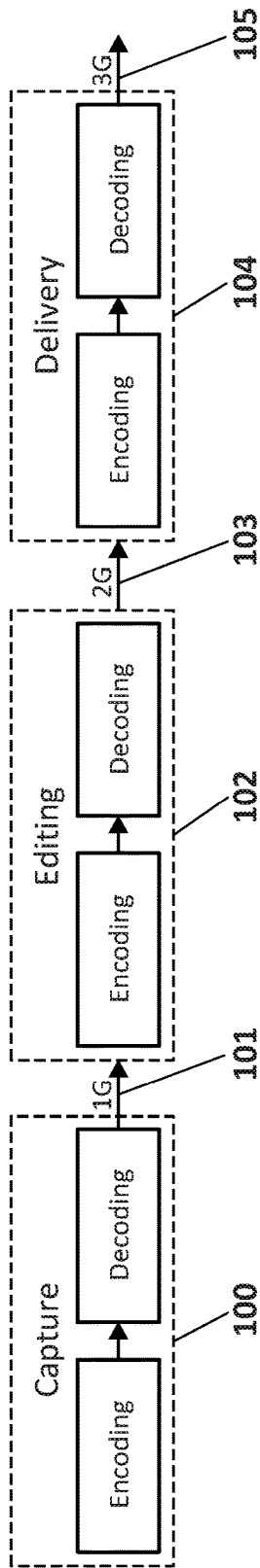
FIG. 1 is a diagram showing an example of a three-stage re-encoding or multi-generation process, according to the prior art.
Figure 2:
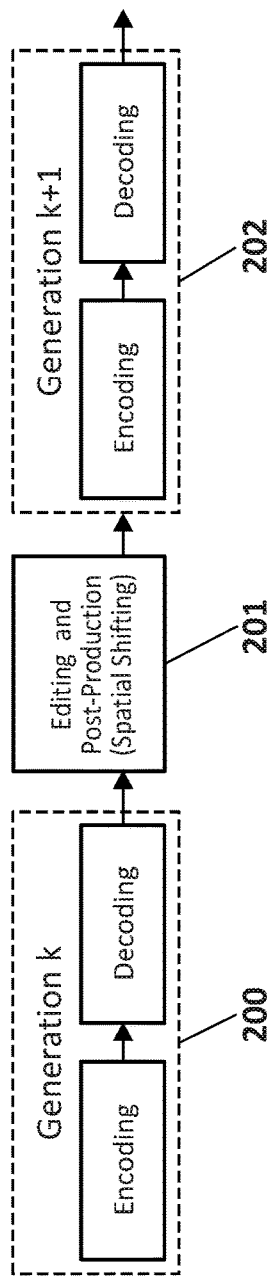
FIG. 2 is a diagram showing an editing and post-production stage that results in spatial shifting between two re-encoding generations, according to prior art.
Figure 3:
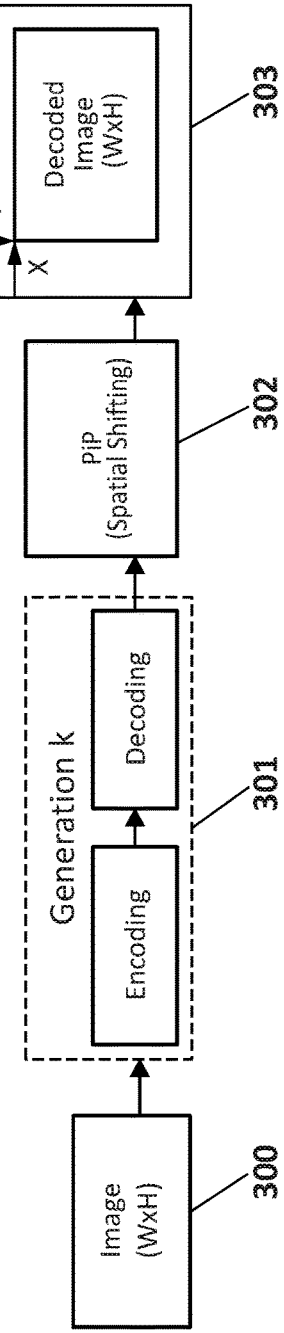
FIG. 3 is a diagram showing a PiP step that results in spatial shifting between two re-encoding generations, according to prior art.

Throughout the attached figures and hereinafter in the current description, some reference numbers are used for ease of understanding the invention. The first or first two digits (as the case may be) of such reference numbers represent the figure in which they appear, while the last two digits thereof represent the specific features or stages of the figure to which they refer.

DETAILED DESCRIPTION OF THE PREFERRED EMBODIMENTS

Before describing the preferred embodiment of this invention, the terminology and some notions will be described to improve understanding.

Displacement with Period N

If an encoded image with a transform of size N×N is displaced N pixels in any direction, the blocks' location in the displaced image is collocated with the blocks' location in the original image. For all purposes, the calculations made over these displaced blocks are the same as those made without displacement, so the displacement can be considered cyclic modulus N. Therefore, in this document, the displacement's search will be performed in the interval (0, . . . , N−1) for each direction (horizontal and vertical).

Displacement Direction

With respect to the direction of displacement, it is taken as given that displacements towards right and down will be considered "positive" displacements, while displacements towards left and up will be considered "negative" displacement, taking as the origin of coordinates (0,0) the image's upper-left corner.

FIG. 5 shows examples of both positive 500 and negative 501 horizontal displacements.

In the positive displacement, the coded blocks of size N×N 502 have been displaced P pixels 503 with respect to the origin, losing the last P columns at the right of the image 504, and new P pixels of columns have been introduced at the left of the image. These were not originally present in the image.

On the other hand, a negative P pixels of displacement 505 implies the loss of the first P columns and the introduction of another new P pixels of columns at the right of the image. These were not present in the original image.

Computational Cost Reduction

Generally, the distortion of a quantized image is calculated by comparing the original image and the reconstructed image, which requires its complete decoding. However, as will be seen hereinafter, if the transformation used is orthonormal, upon compliance with the principle of conservation of the Parseval energy, this distortion can be computed in the transformed domain. According to a preferred embodiment of the present invention, this property of orthonormal transformation is used to avoid calculating the reverse transformation, which would imply a higher computational cost.

To further reduce this cost, a preferred embodiment of the present invention takes advantage of the separability property of the two-dimensional transformations commonly used by video-compression algorithms, which allows these transformations to be calculated as two independent, one-dimensional transformations. This in itself reduces the number of products and sums to calculate, while also allowing elaboration of an algorithm that avoids the need to make multiple calculations of the same one-dimensional transform.

Impact of GOP Alignment

Figure 6:
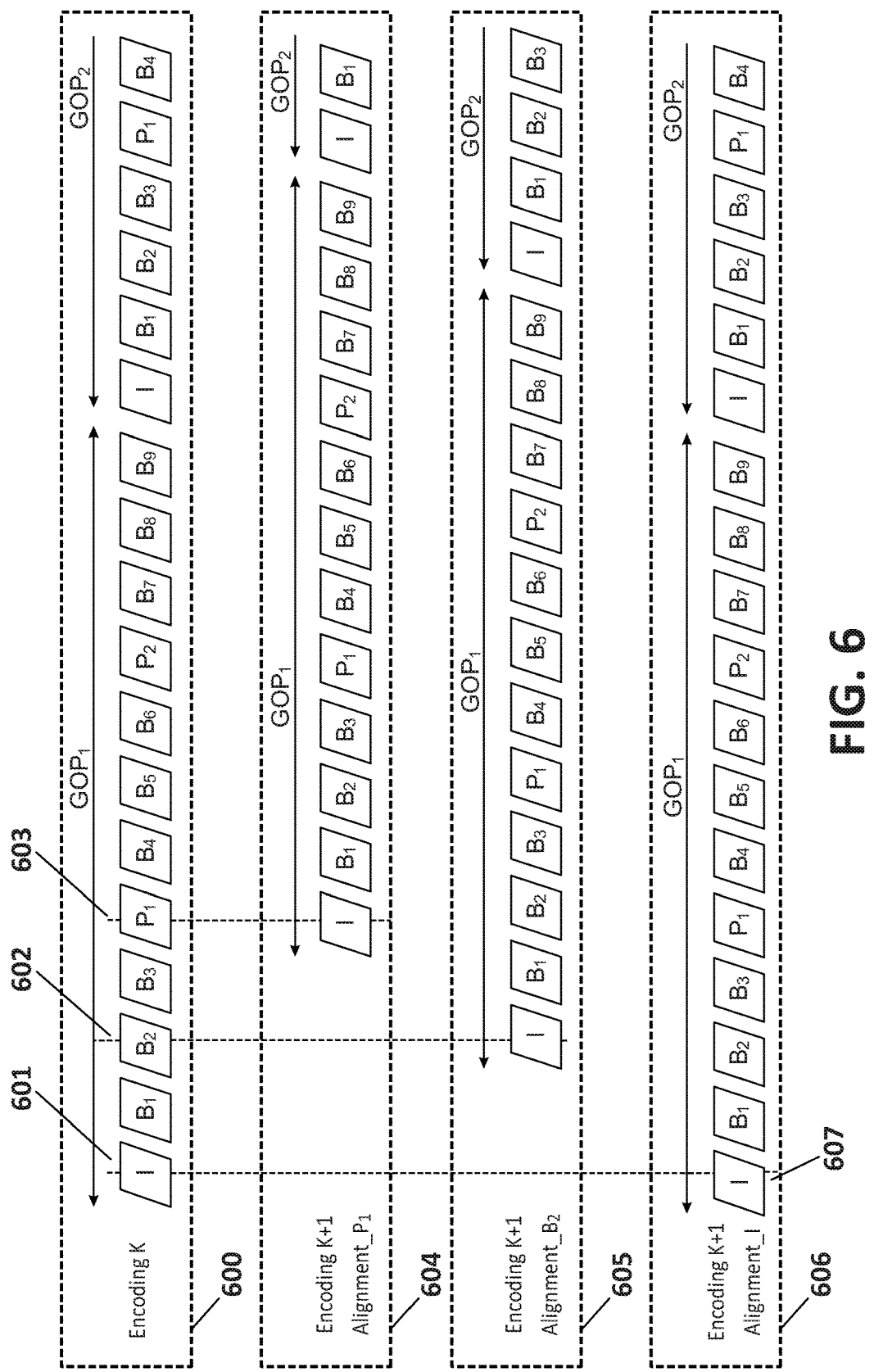
FIG. 6 shows different cases of GOP misalignment of later encoding generations.

As mentioned above, the GOP structure that obtains the highest compression efficiency applies a structure in which I, B, and P pictures alternate. For example, FIG. 6 shows a sequence of images corresponding to a "K" encoding generation 600, with the following GOP structure of length 12: $IB_1B_2B_3P_1B_4B_5B_6P_2B_7B_8B_9$. As can be seen, the structure starts with an "Intra" (I) picture 601, followed by three pictures with bi-directional predictive coding (B) 602, and then a picture with unidirectional predictive coding (P) 603. This is followed by three B pictures, one P picture, and three B pictures until reaching the total GOP length.

FIG. 6 depicts several K+1 encoding cases 604, 605, and 606. In the first case (Alignment_$P_1$) 604, a re-encoding K+1 has the same GOP structure but has four displaced pictures with respect to the previous GOP, where the new encoding starts on the P 603 picture of the previous encoding.

In the second case (Alignment_$B_2$) 605, a K+1 re-encoding of the initial structure has a two-picture time misalignment with respect to the initial GOP, with the new encoding starting from the second B picture 602 of the previous encoding.

Finally, in a third case (Alignment_I) 606, a K+1 re-encoding has the same GOP structure but it is perfectly aligned with the previous encoding's GOP. The first I picture 607 is of the same type as that first I" picture in the previous encoding 601.

Figure 7:
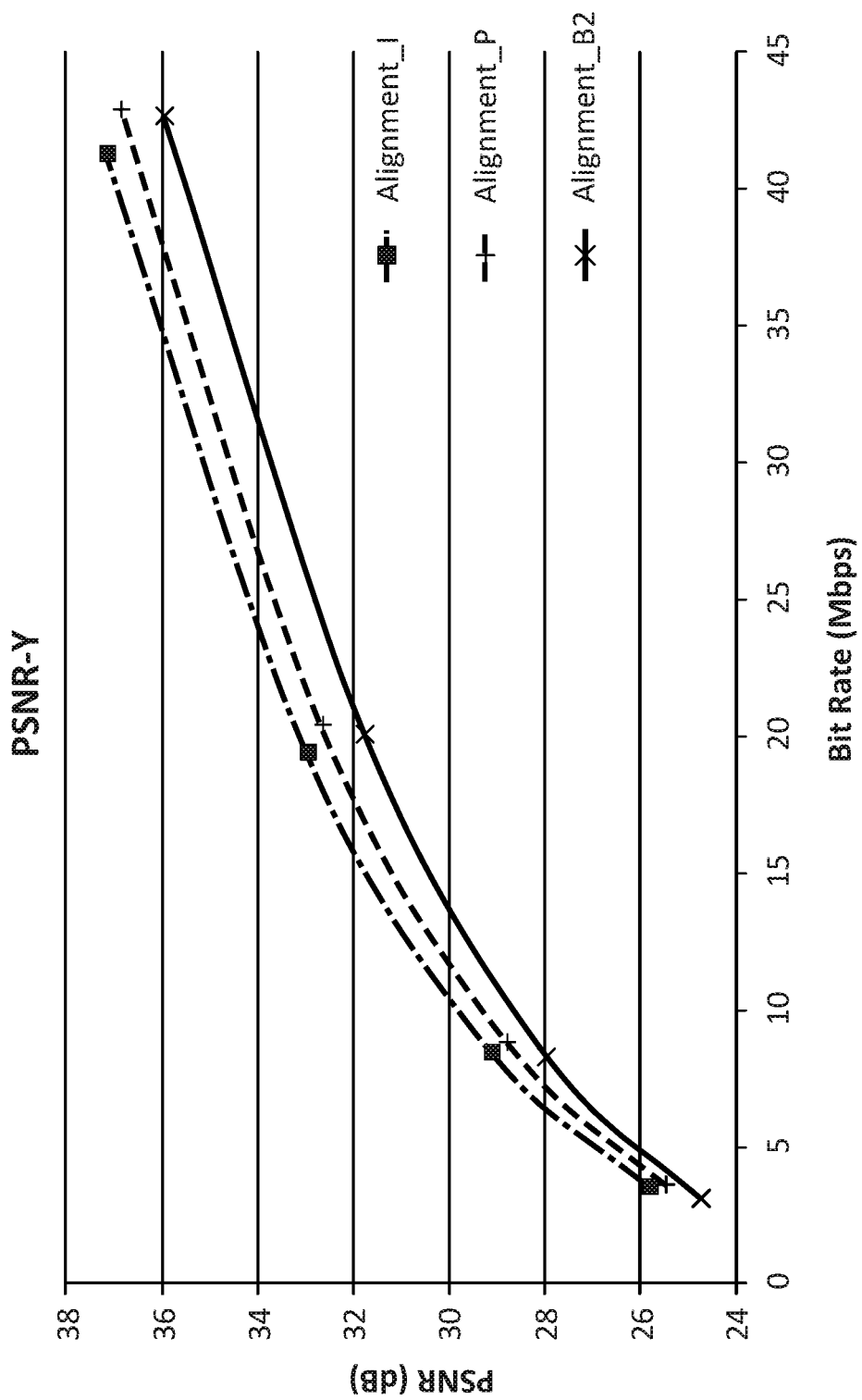
FIG. 7 shows the resulting objective quality, measured in terms of PSNR, for each of the cases in FIG. 5.

FIG. 7 shows the objective quality, measured in terms of PSNR, obtained for each of the K+1 recoding scenarios described in FIG. 6, where, as mentioned above, "Alignment_$B_1$," corresponds to the misalignment of two pictures 605, "Alignment_P" corresponds to the misalignment of four pictures 604, and "Alignment_I" corresponds to the alignment of GOP 606. As shown, the highest quality is obtained when GOP structures in the K and K+1 generations are perfectly aligned, "Alignment_I." The resulting quality from the misalignment of two pictures, "Alignment_B2," and four pictures, "Alignment_P," is lower than that obtained for the perfectly aligned GOP mode, reaching losses up to 1.5 dB.

Figure 8:
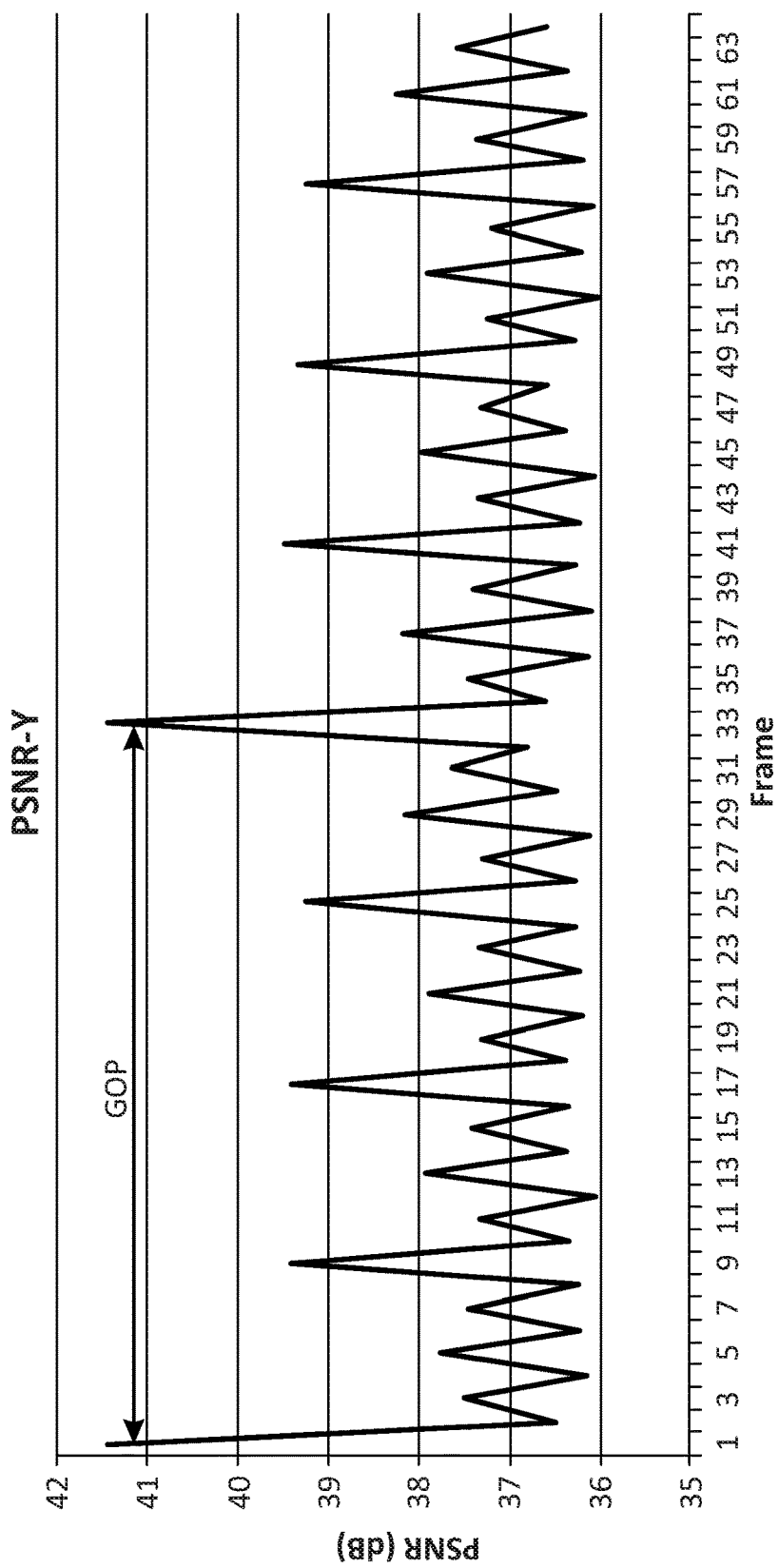
FIG. 8 shows the resulting objective quality, in terms of PSNR, obtained in the encoding of 64 pictures of a video sequence.

FIG. 8 shows the objective quality resulting from the encoding of 64 pictures with a GOP structure of 32 pictures, using 7 B pictures between each pair of P pictures, and therefore having a GOP length of 32 pictures 800. As can be seen in this figure, the two highest-quality images 801 and 802, pictures 1 and 33, correspond to the I pictures in each GOP, with a PSNR value over 41 dB.

Likewise, as shown, in the first GOP there are three pictures spaced apart from each other by eight pictures 803, which correspond to the three P pictures included in each GOP. These achieve a PSNR over 39 dB. Finally, the rest of the images obtain a lower quality, corresponding with the B pictures of the GOP, for example 804.

Preferred Embodiments

According to the preferred embodiment of the present invention, the method will hereinafter be applied independently to each of the images belonging to such a video sequence. However, one skilled in the art will appreciate that in further embodiments of the present invention, the method may be applied to still images, whether or not they belong to a video sequence comprising multiple images.

The method according to the preferred embodiment of the present invention comprises, first, determining whether an image has experienced a spatial shift after its decoding. If so, a compensating displacement is applied to the image, placing the displaced image in a new image of higher resolution, called a "Super-Frame," with the aim of matching the position of the newly transformed blocks with the position of the blocks in the previous encoding. Finally, the method informs the decoder that cropping must be applied to retrieve the original image at the same position at which it was given to the encoder.

The method can be applied to estimate the vertical or horizontal spatial displacement of the image.

According to the preferred embodiment of the present invention, the detection of spatial shifting in an image comprises the following steps:

calculating the distortions resulting from each spatial shift, and determining the horizontal and vertical spatial shifts of the image based on the distortions calculated as resulting from each spatial shift.

Indeed, the inventors have found that minimal distortion occurs when the transformed blocks of a new recoding match spatially with the position of the blocks of the previous encoding. Based on this observation, the method of the present invention involves determining the position of the transformed blocks in the previous encoding, encoding the blocks of the image with different displacements (x, y), and computing the encoding error or distortion for each of these shifts.

Figure 9:
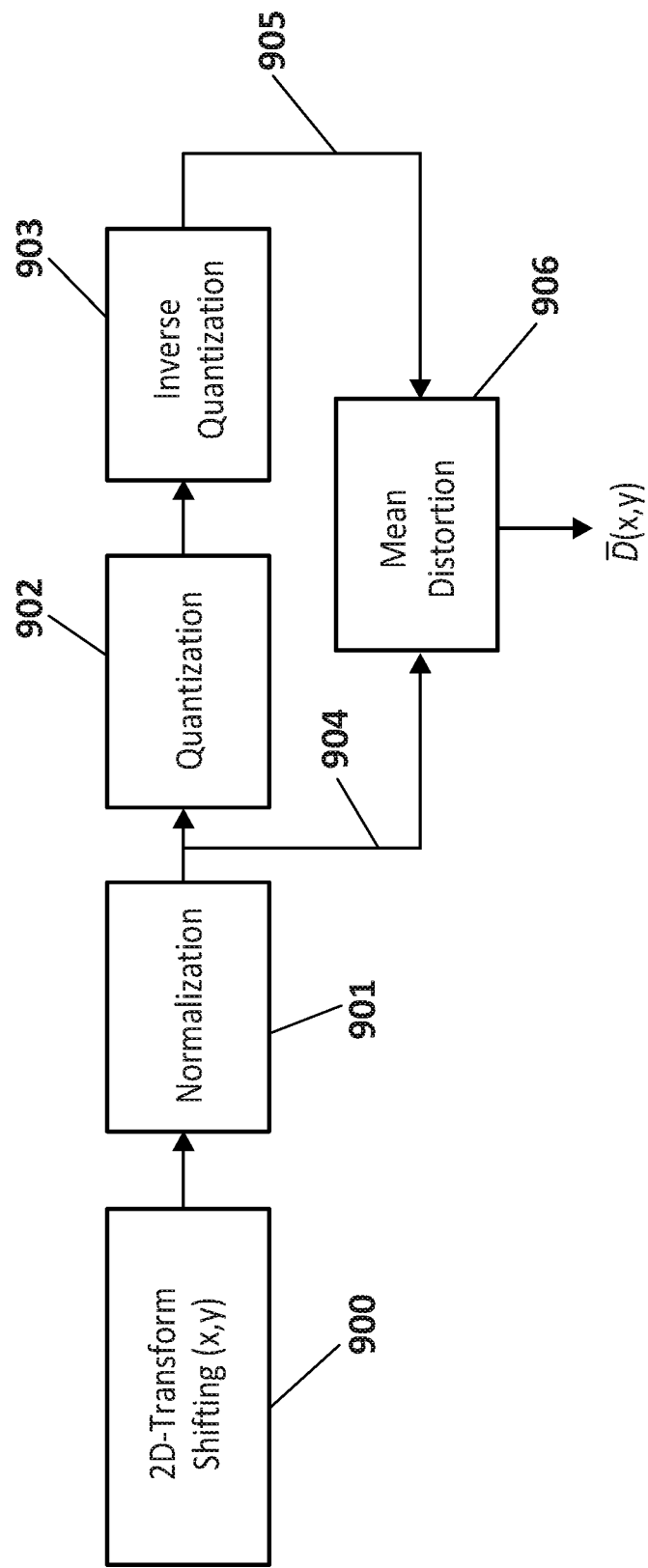
FIG. 9 shows a diagram of the steps involved in calculating the distortion in the method, according to a preferred embodiment of the present invention.

FIG. 9 shows an overall scheme of the steps involved in computing the distortion in the method according to a preferred embodiment of the present invention, in which this distortion calculation step applies exclusively to the luminance component, since this component determines the characteristics of the image with higher fidelity than would the chrominance components. However, one skilled in the art will appreciate that in further embodiments of the present invention, the method may be applied to the chrominance components of another color space from the many types that exist or may later exist for digital images, such as RGB, CIELAB, or any combination of the same.

As shown in FIG. 9, the image is first locally transformed by two-dimensional orthogonal transforms of size N×N for displacements (x, y), ∀ x, y=0, . . . , N−1 900. In the event that an orthogonal transform but its base functions are not normalized, the transformed coefficients of each block obtained after said transformation are then normalized 901. This step is unnecessary if the base functions of the transform are already normalized.

Then, these coefficients are quantified 902 and then inversely quantified 903, thereby obtaining the reconstructed values of the transformed coefficients 905. Thus, the mean distortion of the image can be computed in the transformed domain 906 by comparing the transformed coefficients 904 and their reconstructed values 905, as will detailed hereinafter.

Figure 10:
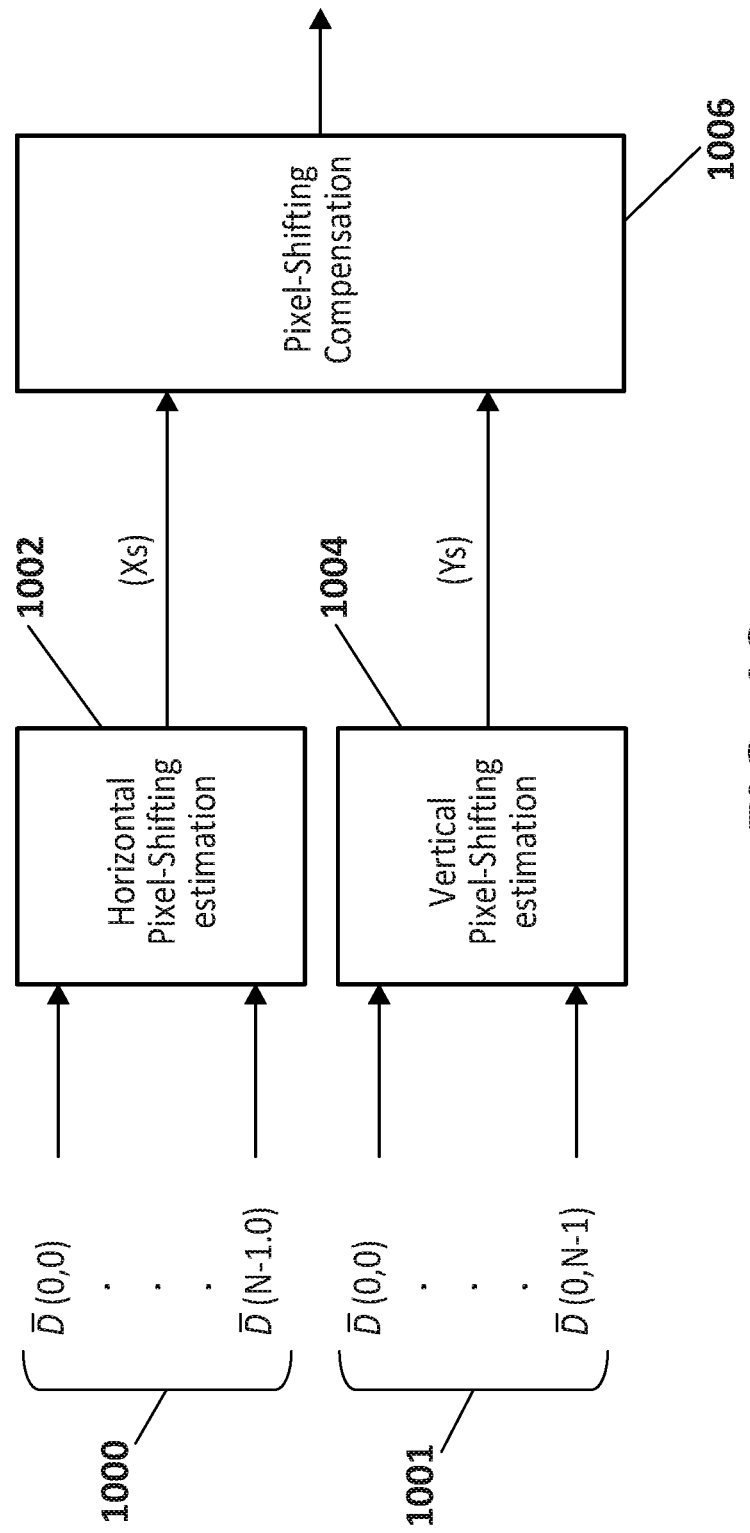
FIG. 10 shows a diagram of the stages for the determination and compensation for the spatial shifting by the method according to a preferred embodiment of the present invention.

In FIG. 10, once the distortions for each of the displacements (x, y) 1000 and 1001 are computed, these are used as inputs to a horizontal space-shift estimator 1002 and a vertical one of the same 1004 to determine the image shift. If needed, this displacement is compensated for 1006 in order that the transformed blocks of the new encoding match the spatial position of the blocks in the previous encoding.

As is known to one skilled in the art, video-compression schemes based on transformational block coding generally use a square, two-dimensional transformation based on the DCT. For example, standards like JPEG, MPEG-1, MPEG-2, and MPEG-4 (Part 2) use an 8×8 DCT transform. H.264 uses DCT transforms of 8×8 and 4×4 sizes to allow its implementation with integer arithmetic, and HEVC uses another integer DCT approach with block sizes of 4×4, 8×8, 16×16, and 32×32. Video encoding formats used in professional environments, on the other hand, such as AVC-I, XDCAM, and DNxHD, exclusively use a DCT of 8×8 size.

The method according to the preferred embodiment of the present invention allows the use of any orthogonal two-dimensional transformation, as well as any size of transform, although the vast majority of compression algorithms use an 8×8 block size, though some additionally use bigger or smaller block sizes.

Given an image with W columns and H rows, we define as $B_N(k, l)$ the transformed block of size N×N and coordinates (k, l) with values as shown in Equations (1) and (2):

$$k = N \cdot i, \forall i = 0, \ldots , \left(\frac{W}{N} - 1\right) \quad (1)$$

$$l = N \cdot j, \forall j = 0, \ldots , \left(\frac{H}{N} - 1\right) \quad (2)$$

To detect the spatial shift of images encoded with video compression schemes that apply multiple transform sizes, the method according to the preferred embodiment of the present invention allows adaptation to said schemes by applying the algorithm both as described above and depicted in FIG. 9 for the maximum block size (N) and for those lower transform sizes $$\left(\frac{N}{2^n}, \forall n = 1, \ldots , \log 2N\right) - 2).$$

Figure 11:
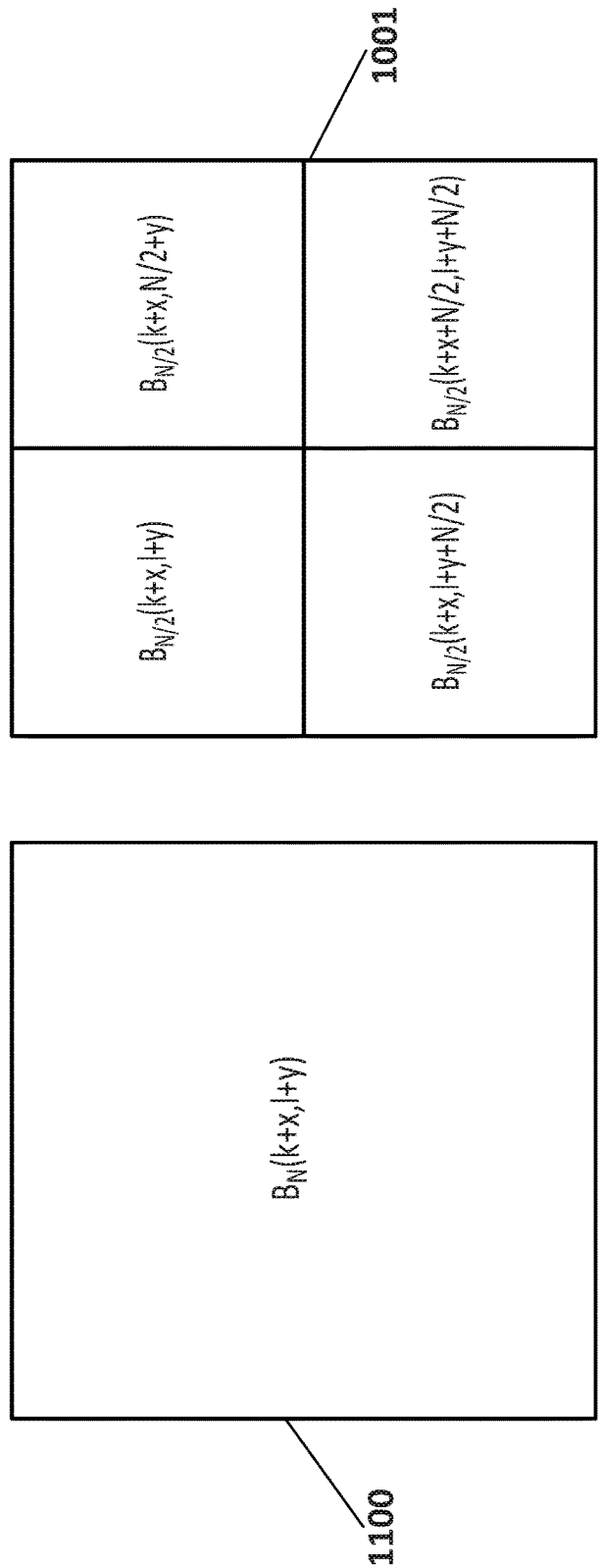
FIG. 11 schematically shows a squared block of size N, along with four squared blocks of size N/2 belonging to such squared block of size N.

For example, and as is shown in FIG. 11, $B_N(k+x, l+y)$ 1100 is a block shifted (x, y) pixels with respect to the coordinates (k, l), and the four sub-blocks $$B_{N/2}\left(k + x + \frac{N}{2}i, l + y + \frac{N}{2}j\right),$$

∀ i, j=0, 1, are the result of dividing $B_N$ into four half-dimension blocks 1101.

D(k+x, l+y) is defined as the distortion for such a block, computed as the lowest distortion obtained between the block $B_N(k+x, l+y)$ 1100 and the sum of the distortion of the four sub-blocks $$B_{N/2}\left(k + x + \frac{N}{2}i, l + y + \frac{N}{2}j\right), \forall i, j = 0, 1 \ 1100.$$

Equation (3) below shows an example of the distortion computation using a video encoding scheme with two transform sizes, N and N/2, as shown in FIG. 11, where $D_N$ is the distortion computed for a transformed block of size N×N and $D_{N/2}$ is that computed for transformed sub-blocks of size N/2.

$$D(k + x, l + y) = \quad (3)$$

$$\min\left\{D_N(k + x, l + y), \sum_{i=0}^{=1} \sum_{j=0}^{1} D_{N/2}\left(k + x + \frac{N}{2}i, l + y + \frac{N}{2}j\right)\right\}$$

In cases considering more than two block sizes, this process is repeated for all lower-resolution blocks.

Like most video compression algorithms, the method according to the preferred embodiment of the present invention uses the separability property of orthogonal two-dimensional transformations, such as DCT, to implement the two-dimensional transformation of the image blocks. This property allows implementation of the two-dimensional transformation kernel as the product of two independent, one-dimensional transformation kernels. This is shown in Equation (4) below, in which $B_N(k+x, l+y)$ 1100 is the block that will be transformed for a displacement (x, y); Av(u, v) and Ah(u, v) are the one-dimensional vertical and horizontal transform kernels, respectively; and $Y_{xy}(u, v)$ is the transformed block for that displacement (x, y).

$$Y_{xy}(u,v) = \Sigma_{k=0}^{N-1}[A_v(u,k) \cdot (\Sigma_{l=0}^{N-1} B_N(k+x, l+y) A_h(v,l))] \quad (4)$$

Figure 12:
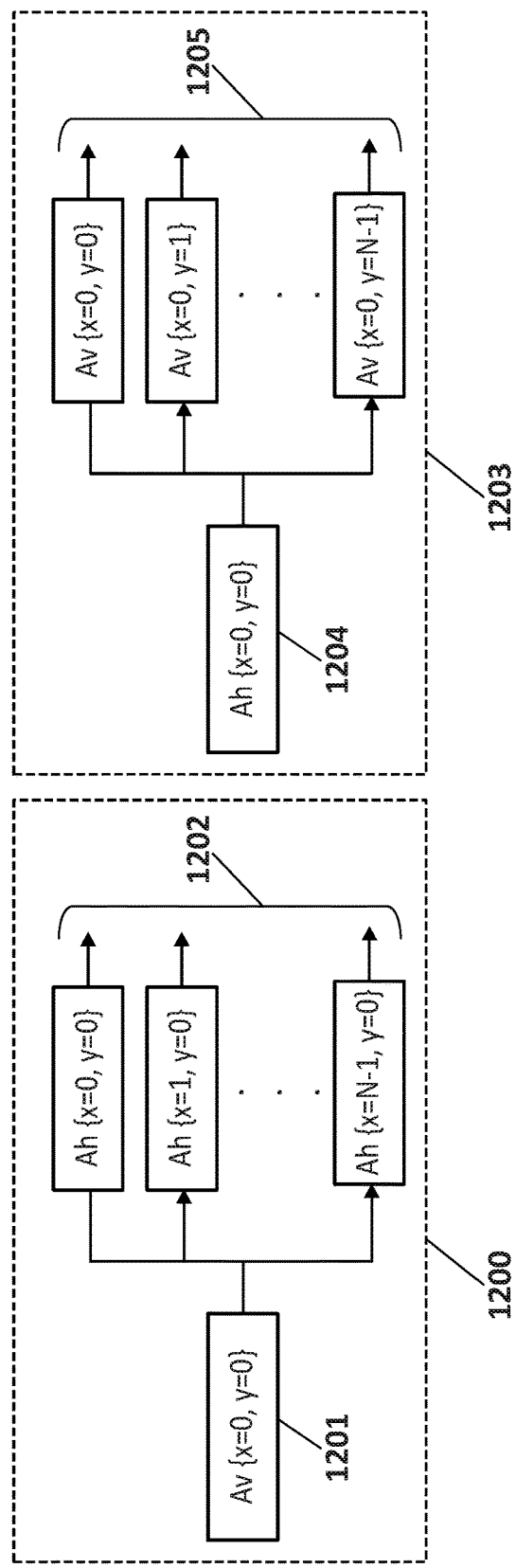
FIG. 12 shows a schematic of the computation of the two-dimensional transform stage as two one-dimensional transforms during the stage computing the horizontal and vertical spatial shifting of the method, according to a preferred embodiment of the present invention.

Using this separability property, the method according to the preferred embodiment of the present invention significantly decreases the computational cost of the transformation process by reducing the number of one-dimensional transformations that must be computed. FIG. 12 shows the proposed scheme for calculating the horizontal 1200 and vertical 1203 spatial shifts, in which it can be seen that the first one-dimensional vertical transformation is only calculated for the null displacement (x=0, y=0) 1201, avoiding computation of the other N−1 one-dimensional transformations for each block in the image. In contrast, the second horizontal one-dimensional transform is performed for each of the N possible displacements 1202. In 1203, it can be seen that the first horizontal one-dimensional transform is only calculated for the null displacement (x=0, y=0) 1024, avoiding computation of the other N−1 one-dimensional transforms for each block in the image. In contrast, the second one-dimensional vertical transformations are performed for each of the N possible displacements 1205.

Figure 13:
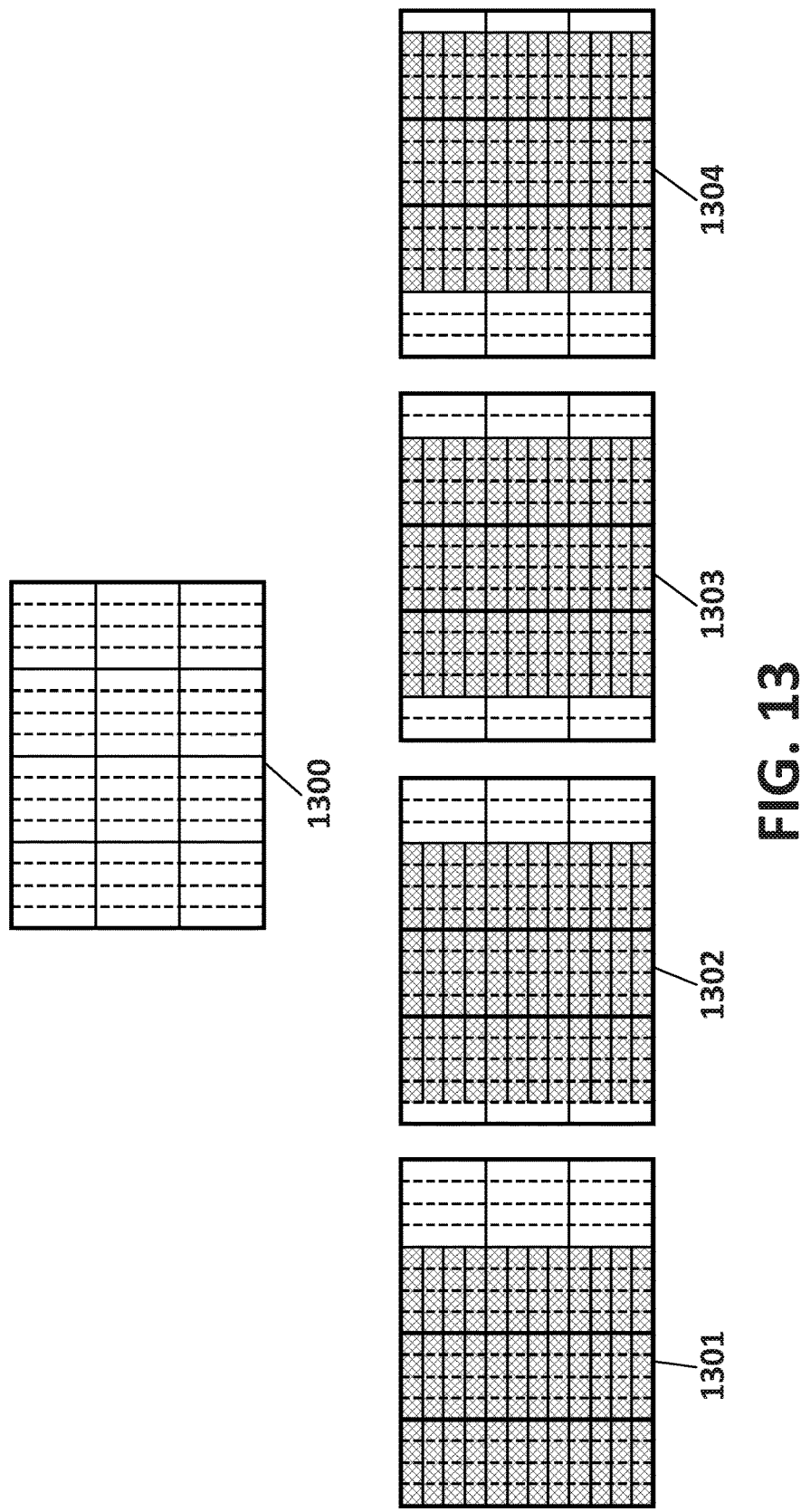
FIG. 13 shows a schematic of the transformation computation for the detection of horizontal spatial shifting according to a preferred embodiment of the present invention.

An example of the computation of the separable transformations for the detection of horizontal spatial shifting is shown in FIG. 13 for a transformed 4×4 block size. Initially, a single, vertical, one-dimensional transformation 1300 is applied over the entire image for the null displacement (x=0, y=0). As shown in said FIG. 13, the other N−1 vertical transforms with horizontal shifting need not be computed since they correspond spatially with those already calculated for a null displacement. The one-dimensional horizontal transformations 1301, 1302, 1303, and 1304 are applied over the result of the vertical transform 1300. The area to which the horizontal transform is applied covers the entire image, except for the last column of blocks 1301, which is shifted to the right, pixel-by-pixel, N−1 times 1302, 1303, and 1304.

The reasoning for computing the vertical spatial shift is the same as that described for the horizontal shift referenced in FIG. 13, except that in the first place a single horizontal one-dimensional transform is made, which is not affected by the vertical displacements, and then N one-dimensional vertical transformations are computed for each of the displacement values of "y" in the range of 0 to N−1.

Generally, for an image with spatial resolution of W columns and H rows, both dimensions being an integer multiple of the size of the N-transform, the total number of one-dimensional vertical $T_v$ and horizontal $T_h$ transforms is defined by Equations (5) and (6), which compute horizontal Pixel Shifting (PS-H) and vertical Pixel Shifting (PS-V), respectively:

$$PS - H \rightarrow T_v = \frac{W \cdot H}{N}, T_h = (W - N) \cdot H \quad (5)$$

$$PS - V \rightarrow T_h = \frac{W \cdot H}{N}, T_v = (H - N) \cdot W \quad (6)$$

The quantization step 902 applied to the transformed blocks, mentioned with reference to FIG. 9 above, introduces an irreversible loss of information. As shown in FIG. 10, the method according to the preferred embodiment of the present invention evaluates this distortion for the N possible block shifts 1000 and 1001 in order to determine the displacement at which the horizontal distortion Xs and vertical distortion Ys are minimized. As in the transformation step, it is possible to implement any scalar quantization, uniform or not, according to the applied transformation.

As mentioned before, if the base functions of the used transform are not normalized (as is true for H.264 and HEVC standards), it is preferable to normalize the transformed coefficients with the normalization factor 901 as a step prior to quantization 902. The purpose of this normalization is to allow the application of Parseval's energy conservation principle when computing the distortion in the transformed domain, thus avoiding computation of the inverse transform over the image's blocks. By doing so, the computational cost of the method according to the preferred embodiment of the present invention is further reduced.

In most video compression schemes, the quantization process is controlled by a parameter called QP ("Quantization Parameter"), which sets the step applied in the quantization process. For example, the H.264 coding standard defines the quantization step (QS) exponentially, as shown in Equation (7) below, where $\lambda_{uv}$ is a quantization constant that may vary for each transformed coefficient Y(u, v) ∀ u, v=0, . . . , N−1.

$$QS(u, v) = \lambda_{uv} 2^{\frac{QP}{6}} \quad (7)$$

The value of the quantized coefficients $Y_{xy}$(u, v) corresponding to a block displaced by (x, y) is calculated according to Equation (8) below, as the closest integer to the quotient between the transformed coefficients $Y_{xy}$(u, v) and the quantization step QS(u, v):

$$L_{xy}(u, v) = \text{round}\left(\frac{Y_{xy}(u, v)}{QS(u, v)}\right) \quad (8)$$

According to the preferred embodiment of the present invention, the same quantization step must be applied to all transformed blocks in the image and for all (x, y) displacements for which the distortion will be calculated. Preferably, this quantization step will be not too large in order to minimize differences between the distortions in different displacements. On the other hand, the quantization step should not be so small that the differences in distortions measured between the different displacements are imperceptible. Empirically, QP values in the range from 15 to 22 have shown reliable distortion values when using the transformations and quantization steps of the H.264 and HEVC video compression schemes.

The reconstructed values 905 obtained by the inverse quantization 903 are calculated by multiplying $Y_{xy}$(u, v) and the quantization step QS(u, v), as shown in Equation (9):

$$\hat{Y}_{xy}(u,v) = L_{xy}(u,v) \cdot QS(u,v) \quad (9)$$

According to the preferred embodiment of the present invention, the distortion for each transformed block is computed by summing the squared differences between the transformed coefficients $Y_{xy}$(u, v) and their reconstructed coefficients $\hat{Y}_{xy}$(u, v), as can be seen in Equation (10) below. Obviously, in further embodiments of the invention, any other distortion metric could be applied.

$$D_N(k+x, l+y) = \sum_{u=0}^{N-1} \sum_{v=0}^{N-1} (Y_{xy}(u,v) - \hat{Y}_{xy}(u,v))^2 \quad (10)$$

Then, the average distortion of the whole image $\overline{D}$(x, y), is calculated as the mean distortion value of all blocks for a given displacement (x, y), which are independently computed for each horizontal (x) 1002 dimension and vertical (y) 1004 dimension, as shown in FIG. 10. For each dimension, distortion is evaluated for all N displacements. The position (x=0, y=0) only needs to be evaluated once for both dimensions, so the total number of evaluations required for detection is reduced to 2N−1.

Equations (11) and (12) below show how to compute the mean distortions for horizontal and vertical displacements, respectively:

$$\overline{D}(x, 0) = \frac{N^2}{(w-N) \cdot H} \sum_{k=0}^{\frac{W}{N}-1} \sum_{l=0}^{\frac{H}{N}} D(k \cdot N + x, l \cdot N), \quad (11)$$

$$\forall x = 0, \ldots, N-1$$

$$\overline{D}(0, y) = \frac{N^2}{(H-N) \cdot W} \sum_{k=0}^{\frac{W}{N}} \sum_{l=0}^{\frac{H}{N}-1} D(k \cdot N, , l \cdot N + y), \quad (12)$$

$$\forall y = 0, \ldots, N-1$$

Figure 14:
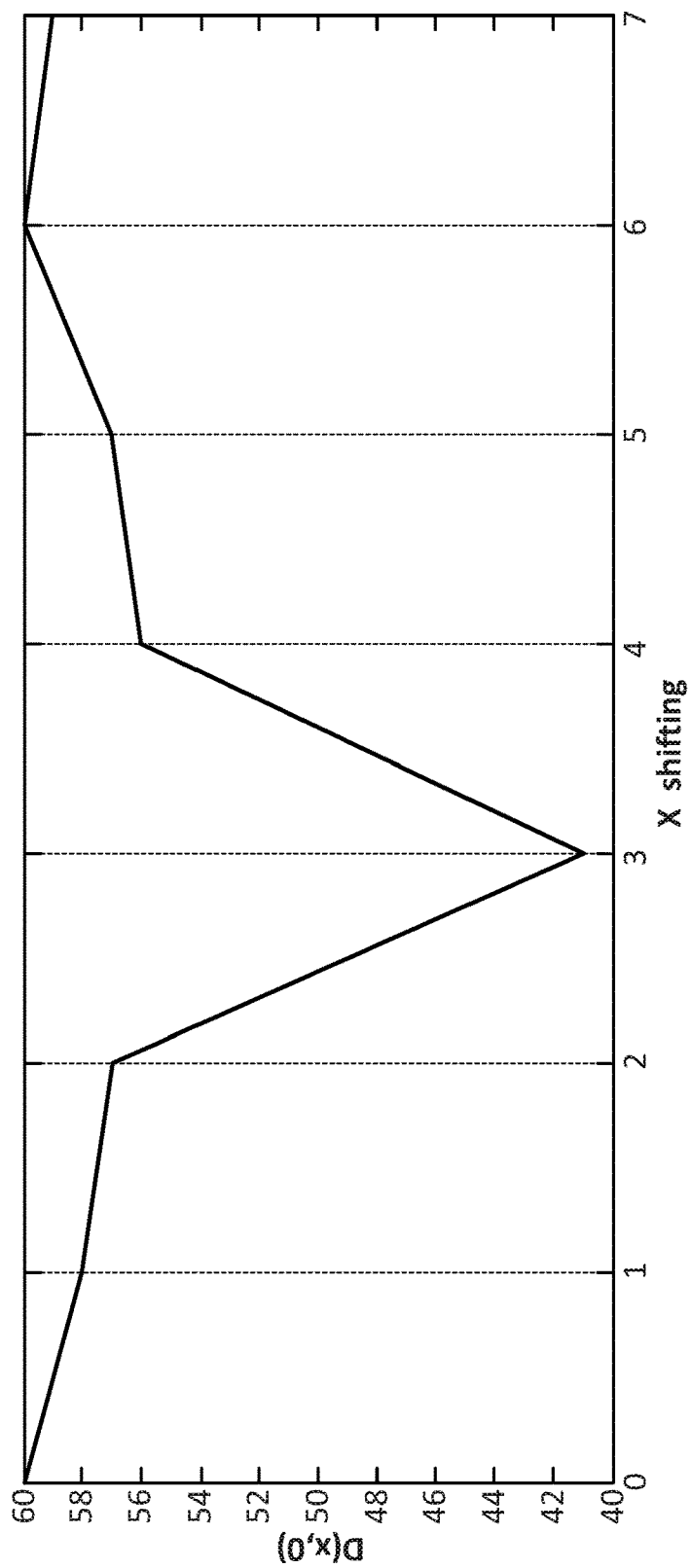
FIG. 14 shows an example of the mean horizontal distortion function.

FIG. 14 shows an example of the mean horizontal distortion function $\overline{D}(x, 0)$ obtained for an 8×8 block, using a video sequence with a horizontal pixel shift of three pixels. As can be seen, the function has an overall minimum at x=3, matching the value of the displacement. After this, the second discrete derivative is computed 1500 for the function $\overline{D}(x, y)$, according to Equations (13) and (14) below, to obtain its minimums.

$$D''(x_i, 0) = D(x_{i+1}, 0) - 2D(x_i, 0) + D(x_{i-1}, 0) \forall i = 0, \ldots, N-1 \quad (13)$$

$$D''(0, y_i) = D(0, y_{i+1}) - 2D(0, y_i) + D(0, y_{i-1}, 0) \forall j = 0, \ldots, N-1 \quad (14)$$

Given that there is a circular displacement effect with period N for the blocks of a transform of size N×N, as described above, the distortion function is considered to be circular with length N for the calculation of its second derivative. Therefore, the second derivative at positions x=0 and y=0 will use as left neighbors those positioned at x=−1 and y=−1, the values of the distortion function for x=N−1 and y=N−1, respectively. Similarly, for the computation of the second derivative at the points x=N−1 and y=N−1, the values of the distortion function at x=0 and y=0 are taken as the respective right neighbors.

Figure 15:
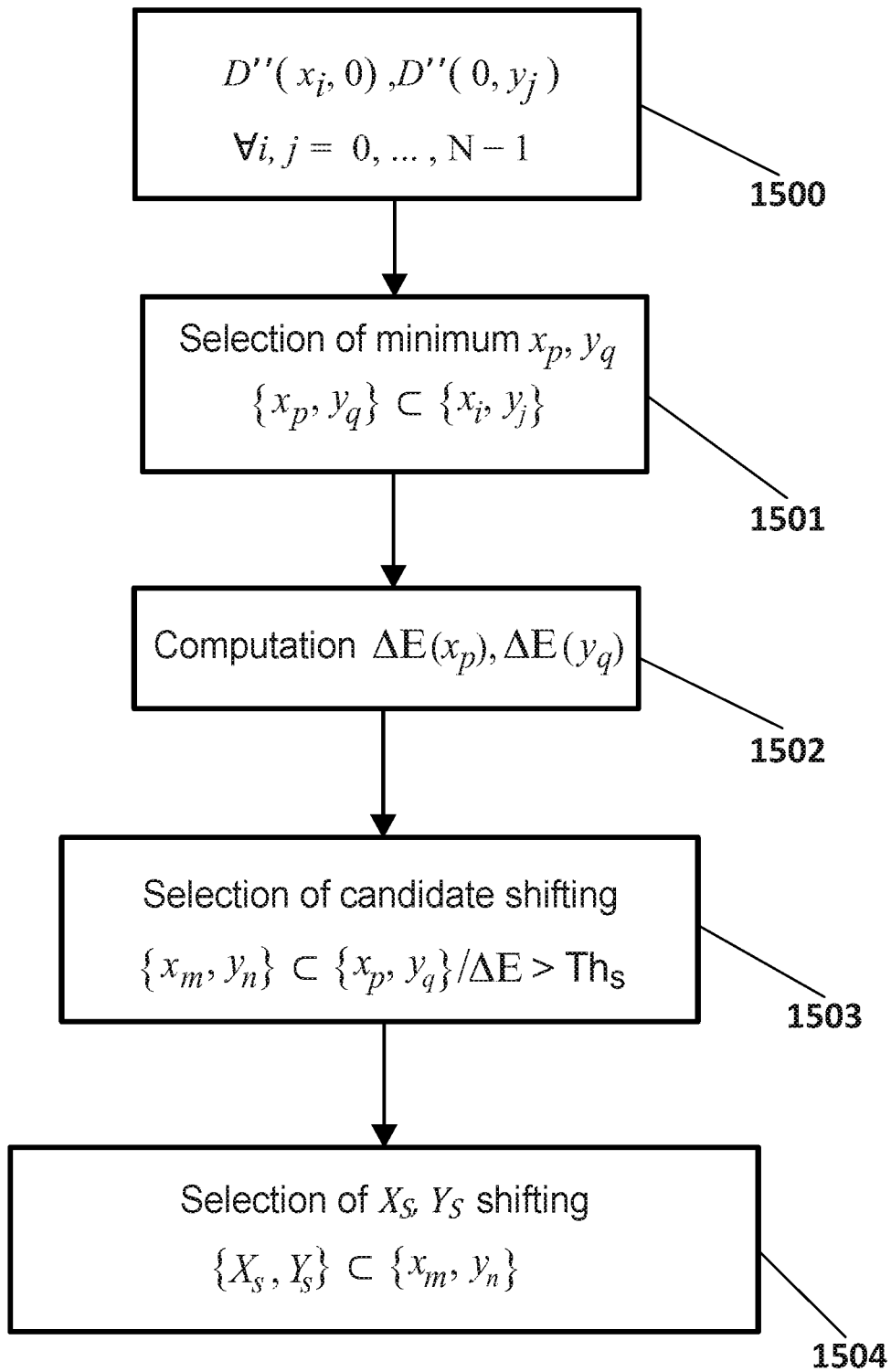
FIG. 15 shows a flow diagram of the shifting computation according to a preferred embodiment of the present invention.

As shown in FIG. 15, the horizontal shifting Xs and vertical shifting Ys of the image are determined by the following steps:

Selecting at the stage 1501 as candidate displacements ($x_p$, $y_q$) those whose values between $x_i$ and $y_i$ match the minimum value of the mean distortion function, $\overline{D}(x_i, 0)$ and $\overline{D}(0, y_j)$, meaning that their second derivative is positive $D''(x_i, 0) > 0$ and $D''(0, y_j) > 0$, and in turn that the second derivative of their immediate left and right neighbors ($x_{p-1}$, $y_{q-1}$) and ($x_{p+1}$, $y_{q+1}$) are negative or zero. Therefore, the maximum number of candidates is N/2. If none of the candidates fulfills this condition, assign a null offset to Xs and Ys.

For each of the candidate displacements ($x_p$, $y_q$), computing at stage 1502 the differential ΔE that estimates the change in trend of the distortion values between the candidate displacement and its neighbors ($x_{p+1}$, $x_{p-1}$) and ($y_{q+1}$, $y_{q-1}$), according to Equations (15) and (16), respectively:

$$\Delta E(x_p) = D'(x_p, 0) - D''(x_{p-1}, 0))^2 + (D''(x_p, 0) - D''(x_{p+1}, 0))^2 \quad (15)$$

$$\Delta E(y_q) = (D''(0, y_q) - D''(0, y_{q-1}))^2 + (D''(0, y_q) - D''(0, y_{q+1}))^2 \quad (16)$$

At step 1503, selecting between the candidate shifts $x_p$ and $y_q$ those valued $x_m$ and $y_n$ for which $\Delta E(x_m) > Th_s$ and $\Delta E(y_n) > Th_s$, where $Th_s$ is a threshold that depends on the size and type of the transform, as well as on the quantification step. This threshold $Th_s$, calculated empirically, allows the rejection of minima of the distortion function for sequences that have not been previously encoded, which are characterized by obtaining very low ΔE values.

Once $x_m$ and $y_n$ are found, determining, in step 1504, the spatial displacement of the image Xs and Ys as the displacement of those values $x_m$ and $y_n$ whose mean distortions are the minima, $\overline{D}(X_s, 0) = \min\{\overline{D}(x_m, 0)\}$ and $\overline{D}(Y_s, 0) = \min\{D(y_n, 0)\}$.

As stated previously, upon detecting that the image has experienced spatial displacement, and after detecting the value of such spatial displacement, the method compensates for such displacement 1006 (FIG. 10) in order that the transformed blocks of the new coding match the position of the blocks in the previous encoding. This stage implies positioning the shifted image in a new image of greater resolution, called a "Super-Frame." The resolution of this new image is (W+N)×H if there has only been a horizontal displacement, W×(H+N) if there has only been a vertical spatial shift, and (W+N)×(H+N) in the case of displacements in both directions.

Figure 16:
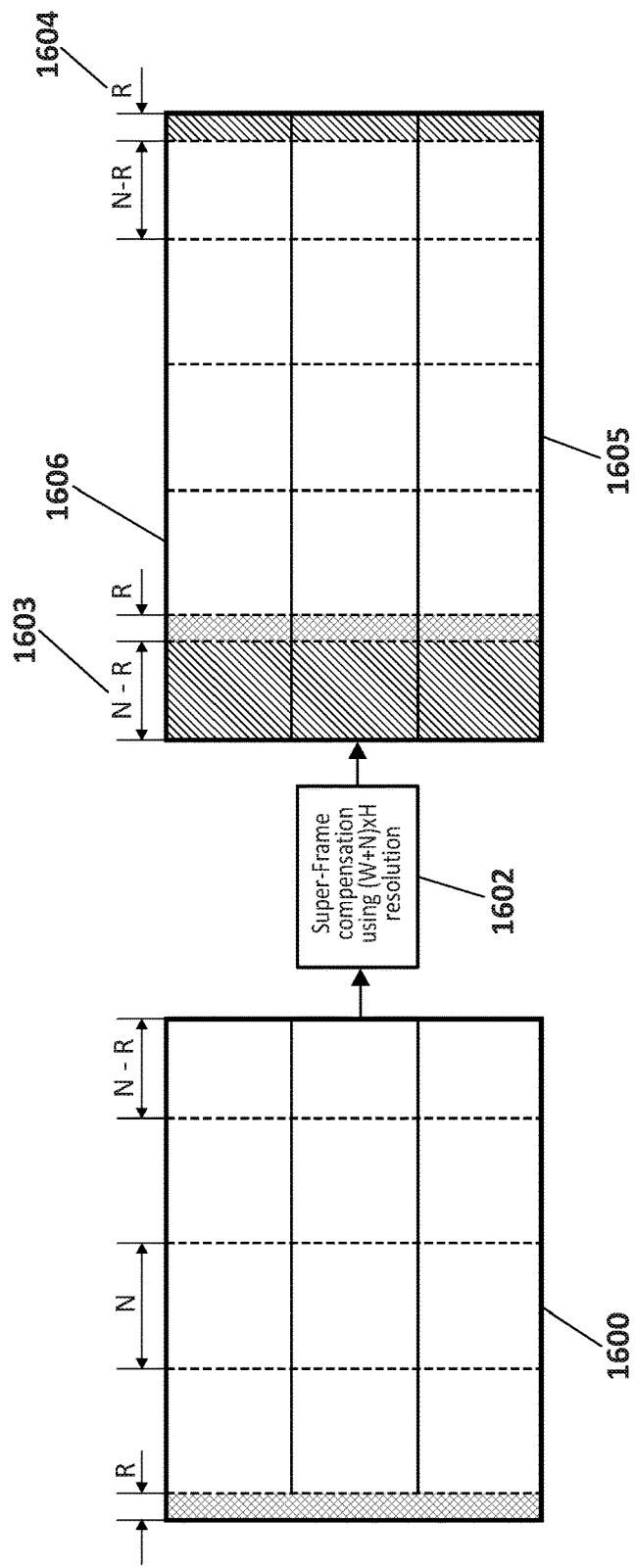
FIG. 16 shows the offset compensation of spatial shifting in an image according to a preferred embodiment of the present invention.

FIG. 16 shows an example of an image with spatial displacement of R pixels to the right that has been compensated 1600. The compensation stage 1602 adds N−R pixels of columns at the left 1603 and R pixels of columns at the right 1604 of the original image. Thus, it can be seen at 1605 that, from the columns of the second block 1606, the block's position in the Super-Frame image matches the positions of the encoded blocks in the original image.

The filling pixels introduced 1603 and 1604 may take any value, but according to a preferred embodiment of the present invention, they take a null value to enable their encoding with the highest efficiency. According to another preferred embodiment of the present invention, these fill pixels take the values of their nearest neighboring pixels.

The method is equivalent for an image with vertical spatial shifting, where the compensation stage adds N−R rows at the top of the image and R rows at the bottom.

More generally, after detecting a displacement of R pixels, R pixels are added in the same direction and N−R pixels are added in the opposite direction of detection.

Empirically, the inventors have found that the reduction in coding efficiency due to the higher resolution of the "Super-Frame" image compared to the original image is negligible compared with the increase in coding efficiency achieved by the alignment of the blocks with the previous encoding, as shown below.

Figure 17:
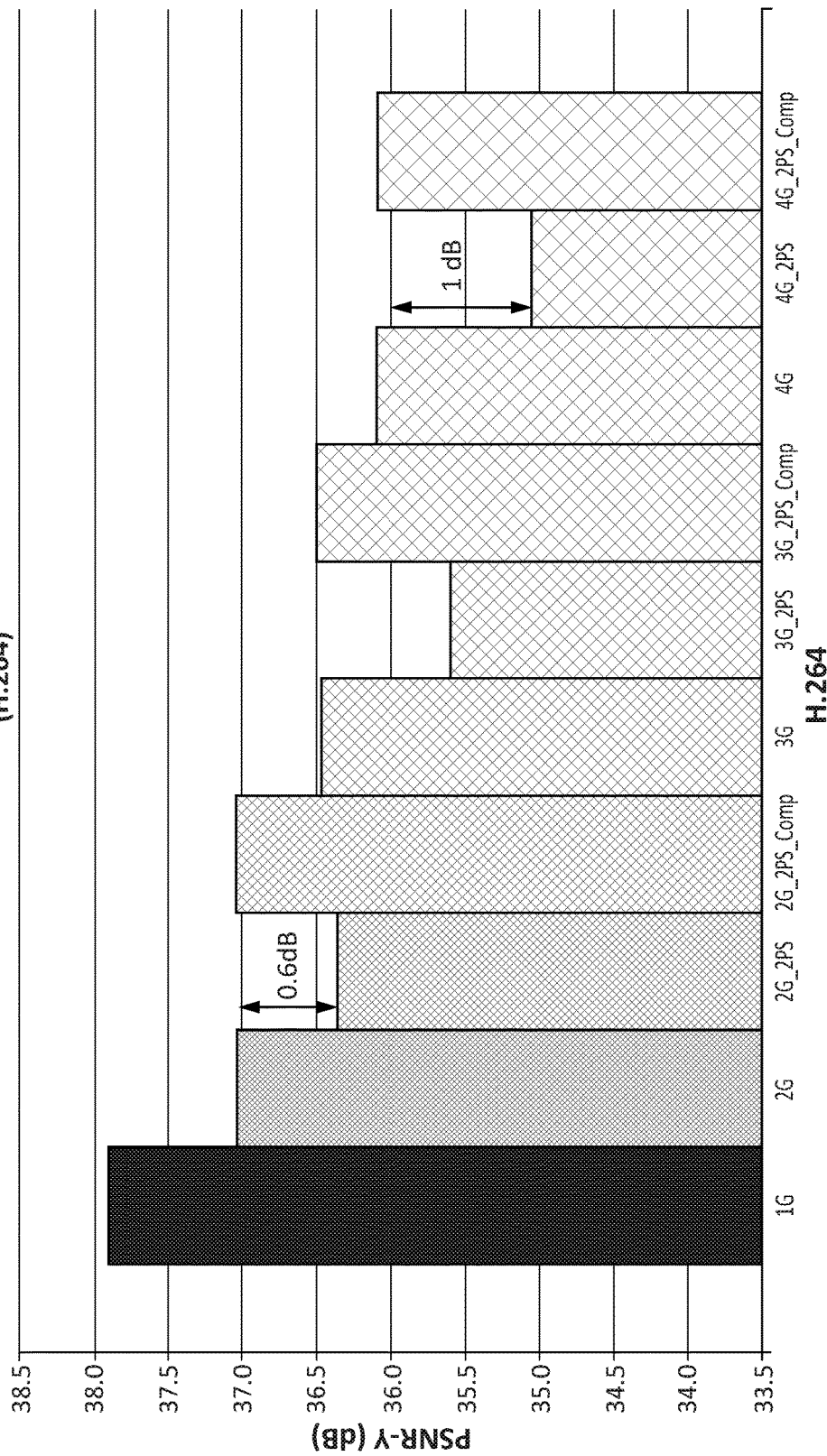
FIG. 17 shows a graph with the resulting objective quality, in terms of PSNR, obtained by the re-encoding of four generations of a video sequence using the H.264 encoding scheme, as well as the resulting objective quality with 2 pixels' shifting and that obtained by applying the pixel shifting compensation method.

FIG. 17 shows the objective quality in terms of PSNR obtained by four encoding generations (1G, 2G, 3G, and 4G) of a video sequence with high-definition resolution using the H.264 standard. Also shown are the resulting quality obtained for four encoding generations using the same video sequence but displaced two pixels to the right (2G_2Ps, 3G_2Ps, 4G_2Ps) and the resulting improved quality obtained after applying the compensation method, according to the preferred embodiment of the present invention, to each generation with shifting (2G_2Ps_Comp, 3G_2Ps_Comp, 4G_2Ps_Comp).

As shown, the quality difference between each generation without spatial displacement (2G, 3G, and 4G) and with spatial displacement (2G_2PS, 3G_2PS, and 4G_2PS) increases progressively, from 0.6 dB in the second generation to 1 dB in the fourth generation. Likewise, applying the method of the preferred embodiment of the present invention (2G_2PS_Comp, 3G_2PS_Comp, and 4G_2PS_Comp) completely reduces losses due to the displacement, matching the quality of that obtained for the coded sequences without displacement (2G, 3G, and 4G).

Figure 18:
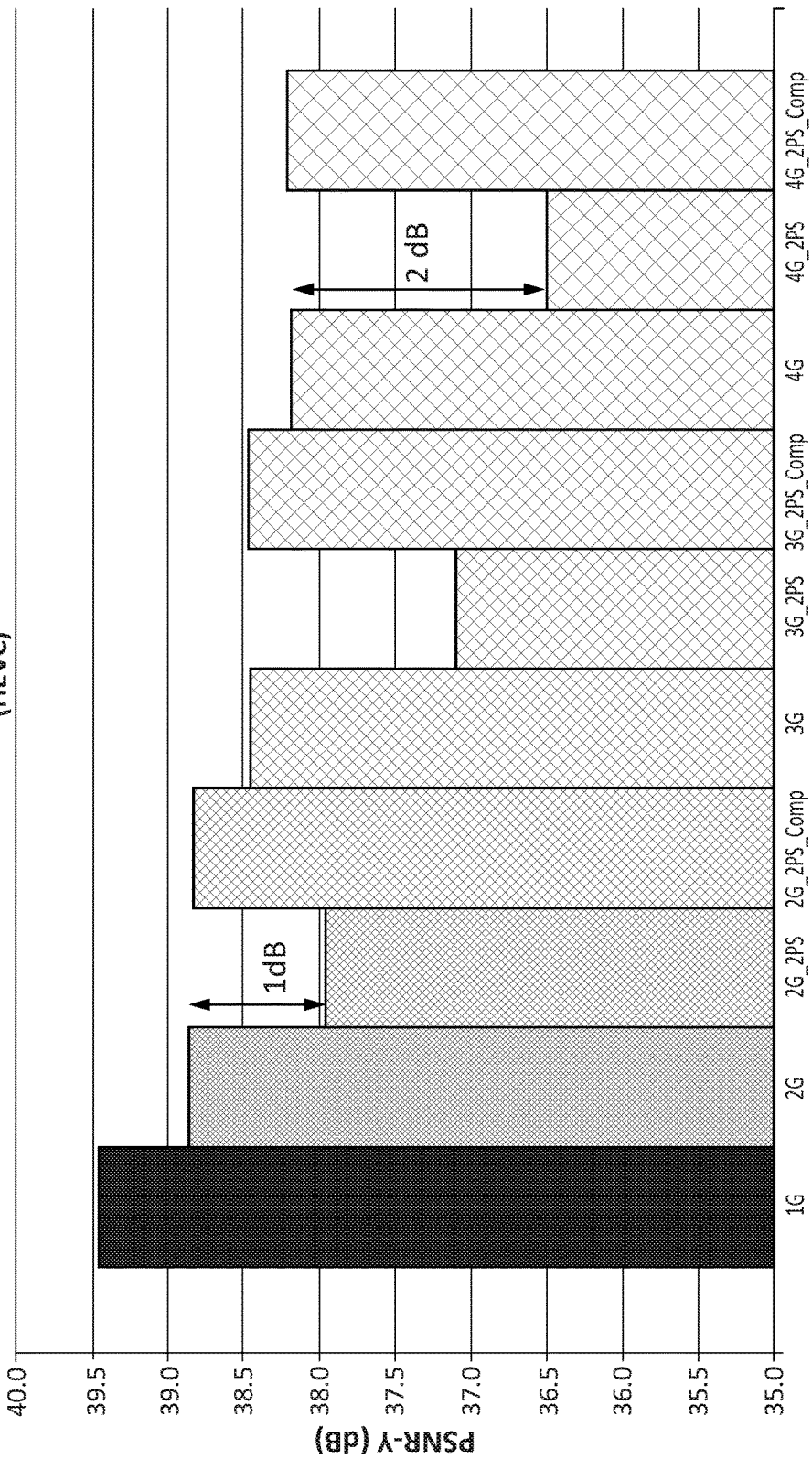
FIG. 18 shows a graph with the resulting objective quality, in terms of PSNR, obtained by the re-encoding of four generations of video sequences with the HEVC encoding scheme, as well as the resulting objective quality with 1 pixel of shifting and that obtained by applying the compensation method.

FIG. 18 shows the results for the same sequence and under the same conditions as in the case shown in FIG. 17 but using the HEVC standard. The trend is very similar to that obtained for the H.264 standard but with even higher spatial shifting losses, close to 1 dB for the second generation and approaching 2 dB for the fourth generation. Again, applying the method according to the preferred embodiment of the present invention to the sequences with spatial displacements increases the quality up to the level of that sequence without spatial displacement, demonstrating the efficacy of the proposed method.

In the last step of the method according to the preferred embodiment of the present invention, the decoder is informed about the cropping area that it must apply to retrieve the image with its original resolution. The rectangular area of cropping is defined by its upper-left and lower-right coordinates.

The method used to inform the decoder of the position and size of the image to be trimmed is defined as the cropping parameter in each standard or coding format for signaling in the data stream, as known to those skilled in the art. This method is widely used in standards such as MPEG-2 and H.264 for encoding video sequences in the high-definition format with a resolution of 1920×1080 pixels. These are encoded in a "Super-Frame" with a resolution of 1920× 1088, adjusting the vertical resolution to a multiple of 16 pixels.

Most encoding schemes introduce syntax elements to transmit this information to the decoder. For example, H.264 introduces the "frame_cropping_flag" indicator in its syntax structure SPS (Sequence Parameter Set) to indicate to the decoder that it must apply a clipping area to the image, defining the coordinates of its vertices with the elements "frame_crop_left_offset," "frame_crop_top_offset," "frame_crop_right_offset," and "frame_crop_bottom_offset."

The HEVC standard also introduces the "conformance_window_flag" element in its SPS structure to indicate to the decoder that it must apply a clipping area to the image, defining the coordinates of its vertices using the elements "conf_win_left_offset," "conf_win_top_offset," "conf_win_right_offset," and "conf_win_bottom_offset."

Thus, in the specific example described with reference to FIG. 16, the cropping information to be transmitted is left_offset=N−R, top_offset=0, right_offset=R, and bottom_offset=0, whereby the cropped image is retrieved with the same resolution as the original one.

According to a preferred embodiment of the present invention, the method allows the quality of a video sequence composed of several images to be improved by providing optimal alignment of the GOP between successive encoding generations.

As mentioned above (see FIG. 8), pictures of different quality are found inside the GOP structure (I, P, B). The highest overall quality is obtained when the GOP of a generation of encoding K+1 is aligned with the pictures of highest quality (I pictures) of the previous generation K (see FIG. 7). Thus, according to the preferred embodiment of the present invention, the method comprises the following steps:

Identifying the pictures encoded with the highest quality inside a GOP structure; and Aligning in terms of time the GOP beginning of the new encoding with the picture identified to have the highest quality.

The method to identify the encoded pictures with the highest quality is based on the $\Delta E(X_S, Y_S)$ values computed as described hereinbefore. In fact, it can be empirically verified that the value of $\Delta E(X_S, Y_S)$ obtained by the method of the preferred embodiment of the present invention for each of the pictures in the video sequence—see Equations (15) and (16)—correlates well with the objective quality of such pictures. So, pictures of higher quality have higher $\Delta E(X_S, Y_S)$ values, while images of lower quality have very low or null values of $\Delta E(X_S, Y_S)$.

Figure 19:
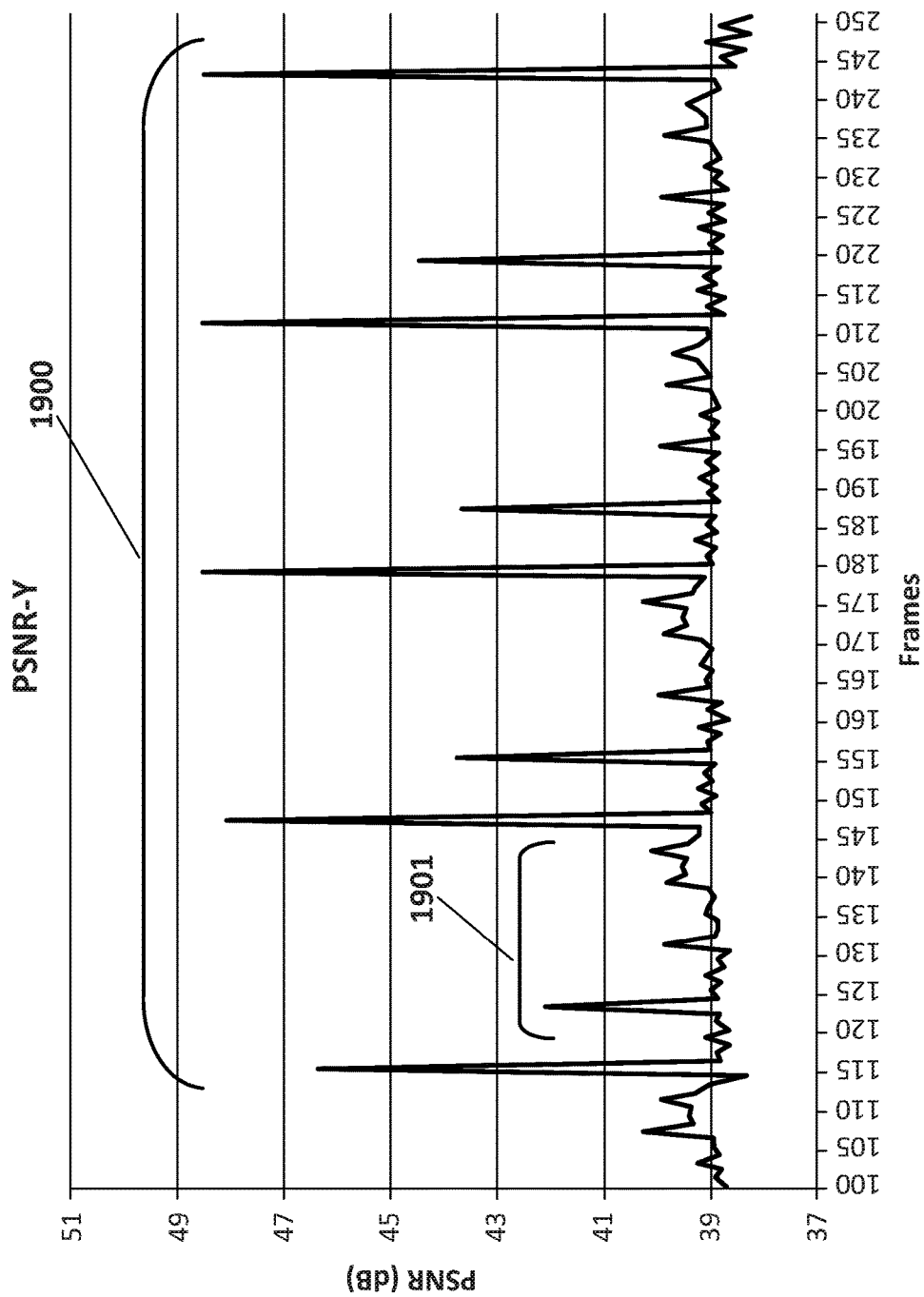
FIG. 19 shows the resulting objective quality, in terms of PSNR, corresponding to 150 images of a video sequence.

As an example, FIG. 19 shows the objective quality in terms of PSNR that corresponds to 150 images of a sequence encoded with a GOP length of 32 pictures using a structure of 7 B pictures and one P picture, repeated periodically within the GOP. This shows that those pictures with the highest PSNR values, over 45 dB, correspond to the I pictures 1900, while those images of lower quality correspond to P and B pictures 1901.

Figure 20:
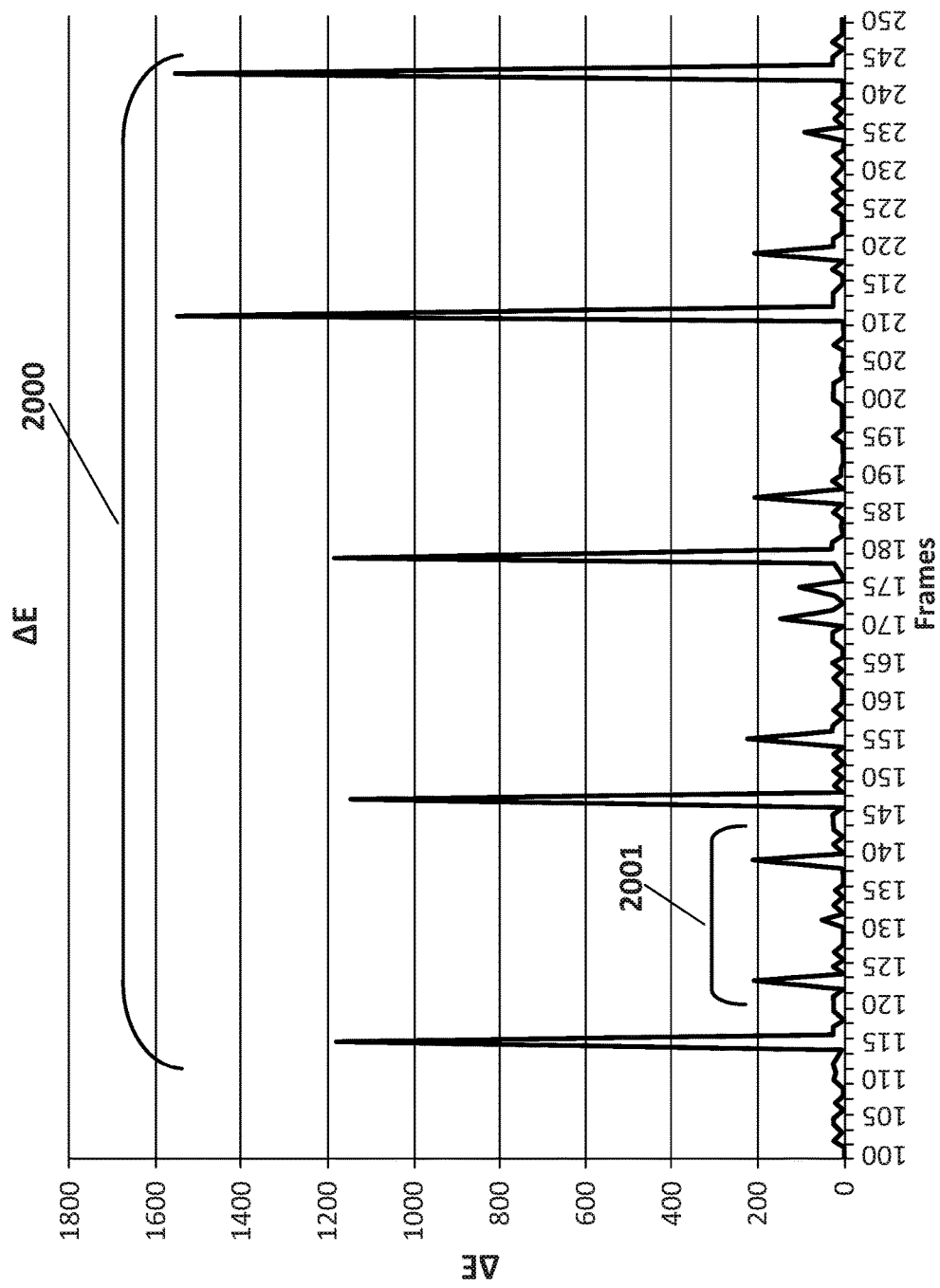
FIG. 20 shows the $\Delta E\ (X_s, Y_s)$ values obtained by a method according to a preferred embodiment of the present invention for the sequence in FIG. 19.

FIG. 20 shows $\Delta E(X_S, Y_S)$ values obtained by the method according to the preferred embodiment of the present invention for the above sequence. As shown, the pictures of the highest quality are identified by their very high $\Delta E(X_S, Y_S)$ values 2000, corresponding to the I pictures in FIG. 19, while the rest of the images have values of $\Delta E(X_S, Y_S)$ that are significantly lower 2001. This fact demonstrates the high correlation between the values of $\Delta E(X_S, Y_S)$ and the objective quality with which the respective pictures has been previously encoded.

The preferred embodiment of the present invention takes advantage of this behavior of the value $\Delta E$ to match the beginning of the GOP of the new encoding with the pictures identified as having the highest quality, thereby reducing multi-generational losses that occur if the GOP starts on one of the lower-quality pictures in the sequence, as described above (see FIG. 7).

Thus, in a first step, the identification of encoded pictures of the highest quality involves calculating the values of $\Delta E(X_S, Y_S)$ based on Equations (15) and (16) for the current picture, as well as the E pictures before and F pictures after the current picture. These pictures define a sliding window centered on the current picture having a length of E+F+1 pictures. The E and F values are user-defined. According to the preferred embodiment of the present invention, the window size (E+F+1) is always greater than the length of the GOP used in the previous encoding. This GOP size is generally unknown, so the E and F values must be high enough that at least one GOP is included in the set of pictures in the sliding observation window.

The E and F values need not be the same, and for real-time applications where delay is important, F can be the number of B pictures between two non-B pictures.

Let $\Delta E(n)$ be the value of $\Delta E(X_S, Y_S)$ of the "$n^{th}$" picture in the observation window. The second derivative of the E+F+1 values is calculated as in Equation (17):

$$\Delta E''(n)=\Delta E(n+1)-2\Delta E(n)+\Delta E(n-1), \forall n=1, \ldots, E+F \quad (17)$$

Next, those candidate pictures are chosen whose values of $\Delta E$ are local maximums, verifying the following Equation (18):

$$\Delta E''(n)<0 \text{ and } \Delta E''(n-1)\geq 0 \text{ and } \Delta E''(n+1)\geq 0, \forall n=1, \ldots, E+F \quad (18)$$

Finally, the encoded pictures of the highest quality are identified as those pictures with local maxima of $\Delta E$; that is, they fulfill the condition expressed in Equation (18). If no pictures meet this condition, it is determined that none of the pictures contained in the observation window has been encoded with a quality much higher than the rest. If a single picture fulfills the condition and if that picture is included among the E pictures prior to the picture under processing, that image is considered to be the true, highest-quality picture within the observation window; however, the encoder will not be able to make a decision to align its GOP with the previous encoder's GOP. If there is a single picture that fulfills the condition and it is included among the F pictures after the picture under processing, that picture is considered to be the highest-quality picture within the observation window, and the encoder will be able to make the necessary decisions to align its GOP with that picture.

The pictures that verify the equation above are those encoded with a higher quality level. If none of the pictures in the window satisfy the equation, it may be concluded that none of the pictures in the sliding window has been encoded with a noticeably higher quality than the others.

If more than one picture is detected that satisfies Equation (18)—that is, whose value of $\Delta E$ represents a local maximum—the method according to the preferred embodiment of the present invention comprises discriminating between such pictures with the aim of selecting the picture with the maximum $\Delta E$ value. For this, a clustering algorithm is applied, for example "k-means," in which the observations are the local maxima that verify Equation (18). Then, two classes of maxima are defined. First, a class called TOP is defined for the maximums of the highest values. Second, a class called BOTTOM is defined for the maximums of the lowest values. Finally, after classification, the encoded pictures included in the TOP class are identified as having the highest quality. Thus, as described above, depending on whether the pictures included in the class TOP belong to the previous E pictures or to the subsequent F pictures with respect to the image under processing, the encoder can make convenient decisions to align its GOP with such pictures having the highest quality.

According to a preferred embodiment of a second aspect of the present invention, the method allows the quality of a video sequence subjected to re-encoding, in which the video sequence is decoded and newly re-encoded, to be improved by aligning the structure of the GOPs in successive encodings without first having to compensate for an eventual spatial shift. Specifically, the method according to the preferred embodiment of this second aspect of the invention comprises the steps as follows:

computing the distortions for each picture that conforms the video sequence;

from the computed distortions, identifying those encoded pictures of the highest quality within a GOP structure of the video sequence; and temporally aligning the beginning of the GOP structure of the new encoding stage with the picture identified as that having the highest quality.

For example, according to a preferred embodiment of the method of the second aspect of the present invention, the step of calculating the distortions for each shift of each of the pictures composing the video sequence comprises the steps described above, with reference to FIG. 9. First, a two-dimensional orthogonal transformation using N×N blocks is applied to each picture of the video sequence and for each displacement (x, y), $\forall$ x, y=0, . . . , N−1 900. If the transform's base functions are orthogonal but not normalized, the transformed coefficients must first be normalized 901. This stage is not needed if the transform's base functions are already normalized.

These coefficients are then quantized 902 and then inverse quantized 903, as described hereinbefore, thereby obtaining reconstructed values of the transformed coefficients 905. In this way, the mean distortion can be computed in the transformed domain 906 by comparing the transformed coefficients 904 and the reconstructed ones 905, as will be detailed hereinafter.

Like the first aspect of the present invention, the method according to the preferred embodiment of the second aspect of the present invention may be adapted to the various video compression schemes known in the art by applying the algorithm described above, with reference to FIG. 9, for the maximum block size of N, as well as for the smaller transform sizes $$\frac{N}{2^n} \forall\, n = 1, \ldots, (\log_2 N) - 2.$$

Next, the distortions for each displacement are calculated as the minimum distortion between those obtained for the blocks of size N and the sums of the distortions for the smaller blocks corresponding to that block of size N.

The two-dimensional orthogonal transformation can be applied, as explained hereinbefore, as the product of two independent, one-dimensional transformation kernels, as shown in Equation (4) below, in which $B_N(k+x, l+y)$ 1100 is the block to transform for the displacement (x, y); $A_v(u, v)$ and $A_n(u, v)$ are respectively the vertical and horizontal one-dimensional transform kernels; and $Y_{xy}(u, v)$ is the transformed block for the displacement (x, y):

$$Y_{xy}(u,v) = \sum_{k=0}^{N-1} [A_v(u,k) \cdot (\sum_{l=0}^{N-1} B_N(k+x,l+y) A_n(v,l))] \quad (4)$$

As explained above, this approach reduces the computational cost of the transformation process used by the preferred embodiment of the second aspect of the present invention.

According to the preferred embodiment of the second aspect of the present invention, the quantization step applied to the transformed blocks must be the same for all blocks of the image and for all displacements (x, y) for which their distortion will be calculated.

This quantization step should not be so large as to obtain high distortions between different displacements. On the other hand, the quantization step should not be so small as to introduce unnoticeable differences in distortion between different displacements. Empirically, good results have been obtained using QP values in the range of 15 to 22 for the transformations and quantifications used by the coding schemes of the H.264 and HEVC encoders.

According to the preferred embodiment of the second application of the method, the distortion is computed by summing the squared differences between the transformed coefficients $Y_{xy}(u, v)$ and the reconstructed ones $\hat{Y}_{xy}(u, v)$ as shown in Equation (10):

$$D_N(k+x, l+y) = \sum_{u=0}^{N-1} \sum_{v=0}^{N-1} (Y_{xy}(u,v) - \hat{Y}_{xy}(u,v))^2 \quad (10)$$

After that, for each picture in the video sequence, mean distortion is computed for the whole image $\overline{D}(x, y)$ as the mean value of the distortions of all the blocks for a given displacement (x, y), calculated independently for the horizontal (x) 1002 and vertical (y) 1004 dimensions, as shown in FIG. 10. For each dimension, the evaluation is done for N displacements. The evaluation at position (x=0, y=0) is done just once, so the total number of computations for detection is 2N−1.

Equations (11) and (12) below show the computation of the mean distortions for the horizontal and vertical displacements, respectively:

$$\overline{D}(x,0) = \frac{N^2}{(w-N)\cdot H} \sum_{k=0}^{\frac{W}{N}-1} \sum_{l=0}^{\frac{H}{N}} D(k\cdot N+x, l\cdot N), \quad (11)$$

$$\forall\, x = 0, \ldots, N-1$$

$$\overline{D}(0,y) = \frac{N^2}{(H-N)\cdot W} \sum_{k=0}^{\frac{W}{N}} \sum_{l=0}^{\frac{H}{N}-1} D(k\cdot N, l\cdot N+y), \quad (12)$$

$$\forall\, y = 0, \ldots, N-1$$

From the calculated distortions, as described above, the highest-quality encoded pictures within a GOP structure of the video sequence are preferably identified in the following manner.

Candidate displacements $(x_p, y_q)$ are chosen between the $x_i$ and $y_j$ values that show a minimum of the mean distortion function $\overline{D}(x_i, 0)$ and $\overline{D}(0, y_j)$; that is, their second derivative is positive $D''(x_i, 0) > 0$ and $D''(0, y_j) > 0$ and the second derivative for the previous $(x_{p-1}, y_{q-1})$ and following $(x_{p+1}, y_{q+1})$ displacements are negative or zero. Therefore, the maximum number of candidates is N/2. If none of the candidates meets this condition, a null offset is assigned to Xs and Ys, as defined hereinbefore.

For each of the candidate displacements $(x_p, y_q)$, the differential value $\Delta E$ is computed, estimating the change in trend of the distortion value between the candidate displacement and its neighboring displacements $(x_{p+1}, x_{p-1})$ and $(y_{q+1}, y_{q-1})$ according to Equations (15) and (16):

$$\Delta E(x_p) = [D''(x_p,0) - D''(x_{p-1},0)]^2 + [D''(x_p,0) - D''(x_{p+1},0)]^2 \quad (15)$$

$$\Delta E(y_q) = [D''(0,y_q) - D''(0,y_{q-1})]^2 + [D''(0,y_q) - D''(0,y_{q+1})]^2 \quad (16)$$

The next step filters the values $(x_m, y_n)$ between the candidate displacements $(x_p, y_q)$ that verify $\Delta E(x_m) > Th_s$ and $\Delta E(y_n) > Th_s$, with $Th_s$ being an empirical threshold that depends on the size and type of transformation, as well as the quantization step. Calculated empirically, $Th_s$ allows minimum values of the distortion function to be rejected if they represent images that have never been previously encoded, as characterized by their very low values of $\Delta E$.

Given $(x_m, y_n)$, the Xs and Ys values are selected as those for which the average distortion is the lowest: $\overline{D}(X_s, 0) = \min\{\overline{D}(x_m, 0)\}$ and $\overline{D}(Y_s, 0) = \min\{\overline{D}(y_m, 0)\}$.

Finally, the pictures of the highest quality are identified as those with the highest $\Delta E$ (Xs, Ys).

Indeed, as described hereinbefore with reference to FIGS. 19 and 20, the inventors have surprisingly found that the quality of a picture in a video sequence in terms of PSNR is related to the value of the differential $\Delta E$. Therefore, a comparison of FIGS. 19 and 20 shows that the pictures within a video sequence having higher $\Delta E$ are also those pictures of higher quality in terms of PSNR.

According to another preferred embodiment of a second aspect of the present invention, the identification of encoded pictures of the highest quality involves calculating the values of $\Delta E(X_S, Y_S)$ based on Equations (15) and (16) for the current picture, as well as the E pictures before and F pictures after the current picture.

These pictures define a sliding window centered on the current picture having a length of E+F+1 pictures. The E and F values are user-defined. According to the preferred embodiment of the present invention, the window size (E+F+1) is always greater than the length of the GOP used in the previous encoding. This GOP size is generally unknown, so the E and F values must be high enough that at least one GOP is included in the set of pictures in the sliding observation window.

The E and F values need not be the same, and for real-time applications where delay is important, F can be the number of B pictures between two non-B pictures.

Let $\Delta E(n)$ be the value of $\Delta E$ $(X_S, Y_S)$ of the "$n^{th}$" picture in the observation window. The second derivative of the E+F+1 values is calculated as in Equation (17):

$$\Delta E''(n) = \Delta E(n+1) - 2\Delta E(n) + \Delta E(n-1), \forall n=1, \ldots, E+F \quad (17)$$

Next, those candidate pictures are chosen whose values of $\Delta E$ are local maximums, verifying the following Equation (18):

$$\Delta E''(n) < 0 \text{ and } \Delta E'(n-1) \geq 0 \text{ and } \Delta E'(n+1) \geq 0,$$
$$\forall n=1, \ldots, E+F \quad (18)$$

Finally, the encoded pictures of the highest quality are identified as those pictures with local maxima of $\Delta E$; that is, they fulfill the condition expressed in Equation (18). If no pictures meet this condition, it is determined that none of the pictures contained in the observation window has been encoded with a quality much higher than the rest. If a single picture fulfills the condition and if that picture is included among the E pictures prior to the picture under processing, that image is considered to be the true, highest-quality picture within the observation window; however, the encoder will not be able to make a decision to align its GOP with the previous encoder's GOP. If there is a single picture that fulfills the condition and it is included among the F pictures after the picture under processing, that picture is considered to be the highest-quality picture within the observation window, and the encoder will be able to make the necessary decisions to align its GOP with that picture.

The pictures that verify the equation above are those encoded with a higher quality level. If none of the pictures in the window satisfy the equation, it may be concluded that none of the pictures in the sliding window has been encoded with a noticeably higher quality than the others.

If more than one picture is detected that satisfies Equation (18)—that is, whose value of $\Delta E$ represents a local maximum—the method according to the preferred embodiment of the present invention comprises discriminating between such pictures with the aim of selecting the picture with the maximum $\Delta E$ value. For this, a clustering algorithm is applied, for example "k-means," in which the observations are the local maxima that verify Equation (18). Then, two classes of maxima are defined.

First, a class called TOP is defined for the maximums of the highest values. Second, a class called BOTTOM is defined for the maximums of the lowest values. Finally, after classification, the encoded pictures included in the TOP class are identified as having the highest quality. Thus, as described above, depending on whether the pictures included in the class TOP belong to the previous E pictures or to the subsequent F pictures with respect to the image under processing, the encoder can make convenient decisions to align its GOP with such pictures having the highest quality.

While the present invention has been described with reference to the preferred embodiments thereof, one skilled in the art may apply variations and modifications to such embodiments without thereby departing from the scope of the invention defined by the following claims.

The invention claimed is:

1. Method for improving the quality of an image subject to re-coding in which the image is decoded and then encoded again, splitting the image into blocks, comprising the steps of:

detecting, after decoding the image, if this image has been spatially displaced;

if so, compensating for the spatial shift by positioning the image in a higher resolution image such that the spatial position of the blocks of the higher resolution image coincides with the spatial position of the image blocks before the decoding; and adding information to inform a decoder of the cropping to be applied to the higher resolution image, in a decoding step after re-encoding, to retrieve the image with its original resolution, wherein the detection of spatial displacement in the image comprises the following steps:

computing the distortions for each displacement; and determining the horizontal and vertical displacements in the image from the distortions computed for each displacement, and wherein the distortion computation comprises:

applying a two-dimensional orthogonal transformation to the N×N blocks of the image for each displacement $(x, y) \forall x, y=0, \ldots, N-1$;

quantifying the coefficients of each block after the transformation;

obtaining reconstructed values of the transformed coefficients by a reverse quantization of the coefficients obtained in the previous quantization step; and computing the distortion for each displacement by comparing the transformed coefficients with their reconstructed values.

2. Method according to claim 1, wherein the distortion is computed by adding the square differences between the transformed coefficients and the reconstructed ones for each displacement.

3. Method according to claim 1, further comprising calculating the mean distortion of the image as the mean value of the distortions of all blocks for a given displacement (x, y).

4. Method according to claim 1, wherein a two-dimensional transformation is applied as the product of two independent one-dimensional transformations in the horizontal and vertical directions.

5. Method according to claim 1, further comprising the step of normalizing the coefficients of each block obtained after the transformation, prior to such quantization and inverse quantization.

6. Method of claim 1, in which quantization and inverse quantization are applied according to one of the H.264 and HEVC standards using a quantization parameter value between 15 and 22.

7. Method according to claim 1, wherein a two-dimensional orthogonal transformation is applied to the image blocks with maximum size to be evaluated (N) and with smaller block sizes $$\left(\frac{N}{2^n}, \forall n = 1, \ldots, (\log 2N) - 2\right),$$

and wherein the distortion for each displacement is calculated as the minimum distortion between those obtained for the block of size N and the sum of the distortions for the smaller blocks corresponding to such block of size N.

8. Method according to claim 1, wherein the determination of the spatial displacement comprises:

selecting as candidate displacements $(x_p, y_q)$ those values that provide a minimum of the mean distortion;

for each candidate displacement, computing $$\Delta E(x_p) = [D''(x_p,0) - D''(x_{p-1},0)]^2 + [D''(x_p,0) - D''(x_{p+1},0)]^2$$

$$\Delta E(y_q) = [D''(0,y_q) - D''(y_{q-1},0)]^2 + [D''(0,y_q) - D''(0,y_{q+1})]^2$$

selecting $x_m$ and $y_n$ values that verify $\Delta E(x_m) > Th_s$ y $\Delta E(y_n) > Th_s$, where $Th_s$ is an empirically selected threshold that depends on the size and transformation type; and from these $x_m$ and $y_n$ values determining the image's spatial displacement $X_s$ and $Y_s$ as the displacement of those $x_m$ and $y_n$ values with the lowest mean distortion.

9. Method according to claim 1, wherein, upon detecting a displacement of R pixels of the image in one direction, a spatial shift compensation comprises:

locating the image in a higher resolution image by adding:
R pixels in the displacement direction, and
N-R pixels in the opposite direction to displacement.

10. Method of claim 9, wherein the added pixels have a null value.

11. Method of claim 9, wherein the added pixels have a value equal to that of the nearest neighboring pixels.

12. Method according to claim 1, wherein the method is applied to the luminance component of the image.

13. Method according to claim 1, wherein the method is applied to the chrominance component of the image.

14. Method as claimed in claim 1, wherein the image belongs to a re-encoded video sequence, and wherein the method is applied independently to each image that belongs to such video sequence.

15. Method of claim 14, further comprising the steps of:

identifying the highest quality images in the GOP structure; and aligning in time the beginning of the GOP from the new re-encoding with the identified picture of highest quality.

16. Method according to claim 15, wherein the identification of encoded images of higher quality comprises:

computing, for an $n^{th}$ image, as well as for E previous pictures and F later pictures, the differential $\Delta E(X_s, Y_s)$ values according to Equations (15) and (16):

$$\Delta E(x_p) = [D''(x_p,0) - D''(x_{p-1},0)]^2 + [D''(x_p,0) - D''(x_{p+1},0)]^2 \quad (15)$$

$$\Delta E(y_q) = [D''(0,y_q) - D''(y_{q-1},0)]^2 + [D''(0,y_q) - D''(0,y_{q+1})]^2 \quad (16)$$

where D'' is the second derivative of the distortion;

with $X_s$ and $Y_s$ being the spatial shifts in the horizontal and vertical directions of the image, respectively, and with E and F being adjustable values;

selecting candidate images whose $\Delta E$ are local maxima by calculating $\Delta E''$; and identifying the encoded images having the highest quality as those with local maxima of $\Delta E$.

17. Method of claim 16, comprising, after detecting multiple images whose $\Delta E$ values represent local maxima, the steps of:

discriminate between said images by a clustering algorithm;

define a TOP class with the maximum of the higher values;
define a BOTTOM class with the maximum of the lower values; and
identify those images in the TOP class as the encoded images of the highest quality.

18. Method of improving the quality of a re-encoded video sequence that is decoded and then re-encoded, comprising the steps of:
Computing, for each of the images that compose the video sequence, the distortions for each displacement;
from these computed distortions, identifying the encoded images of the highest quality within a GOP structure of the video sequence; and
aligning in time the beginning of the GOP of the new re-encoding with the identified picture of highest quality,
wherein the calculation of the distortions comprises the following steps:
applying a two-dimensional orthogonal transformation to the image block with size of N×N for each displacement $(x,y) \forall x, y=0, \ldots, N-1$;
quantifying the coefficients of each block obtained after the transformation;
obtaining reconstructed values of the transformed coefficients by a reverse quantization of the coefficients obtained in the previous quantization step; and
computing the distortion for each displacement by comparing the transformed coefficients with their reconstructed values.

19. Method according to claim 18, wherein the distortion is calculated by adding the square of the differences between the values of the transformed coefficients and their reconstructed values for each displacement.

20. Method according to claim 18, further comprising calculating the average image distortion as the mean value of the distortions of all blocks for a given displacement (x, y).

21. Method according to claim 18, wherein the two-dimensional transformation is applied as the product of two independent one-dimensional transformation kernels in the horizontal and vertical directions.

22. Method according to claim 18, further comprising the step of normalizing the coefficients of each block obtained after transformation and prior to such quantization and inverse quantization.

23. Method of claim 18, wherein such quantization and inverse quantization steps are performed according to one of the H.264 and HEVC standards using a quantization parameter between 15 and 22.

24. Method according to claim 18, wherein the image is transformed using a two-dimensional orthogonal block transformation with maximum size to be evaluated (N) and with smaller block sizes $$\left(\frac{N}{2^n}, \forall n = 1, \ldots, (\log_2 N) - 2\right),$$

computing the distortion for each displacement as the minimum distortion between the distortion for a block size N and the sum of the distortions of the blocks of smaller size corresponding to such block of size N.

25. Method according to claim 18, wherein the identification of higher quality encoded pictures within a GOP structure comprises:
choosing as candidate displacements $(x_p, y_q)$ those values that provide a minimum of the mean distortion;
for each candidate displacement, computing the differential value of $\Delta E$ according to the following Equations (15) and (16):

$$\Delta E(x_p) = (D''(x_p,0) - D''(x_{p-1},0))^2 + (D''(x_p,0) - D''(x_{p+1},0))^2 \quad (15)$$

$$\Delta E(y_q) = (D''(0,y_q) - D''(0,y_{q-1}))^2 + (D''(0,y_q) - D''(0,y_{q+1}))^2 \quad (16)$$

with D'' being the distortion's second derivative;
choosing $x_m$ and $y_n$ values such that $\Delta E(x_m) > Th_s$ and $\Delta E(y_n) > Th_s$, with $Th_s$ being an empirically calculated threshold that depends on the size and type of transformation;
from the $x_m$ and $y_n$ values, obtaining the Xs and Ys values for which the average distortion is the smallest; and
identifying the highest quality encoded images as those whose $\Delta E(Xs, Ys)$ value is the highest.

26. Method of claim 25, wherein the identification of higher-quality encoded images further comprises:
computing the $\Delta E(Xs, Ys)$ values for the image being processed, n, as well as those E previous images and F later images, E and F being adjustable values;
choosing candidate images whose $\Delta E$ values are local maxima according to the values of $\Delta E''$; and
identifying the highest-quality encoded images as those with local maxima values of $\Delta E$.

27. Method of claim 26, comprising, after detecting multiple images whose $\Delta E$ values are local maxima, the following steps:
discriminating between such images by a clustering algorithm;
defining a TOP class of the highest values;
defining a BOTTOM class with those maxima of lower values; and
identifying the images included in the TOP class as the encoded images with the highest quality.

* * * * *